United States Patent
Kaminaka et al.

(10) Patent No.: US 11,326,224 B2
(45) Date of Patent: May 10, 2022

(54) STAINLESS STEEL SHEET AND METHOD OF MANUFACTURING THE SAME, SEPARATOR FOR SOLID POLYMER FUEL CELL, SOLID POLYMER FUEL CELL, AND SOLID POLYMER FUEL CELL BATTERY

(71) Applicant: NIPPON STEEL STAINLESS STEEL CORPORATION, Tokyo (JP)

(72) Inventors: Hideya Kaminaka, Tokyo (JP); Yoshitaka Nishiyama, Tokyo (JP); Koichi Nose, Tokyo (JP); Jun Maki, Tokyo (JP); Junko Imamura, Tokyo (JP); Kohei Maejima, Tokyo (JP); Yuya Takashima, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 133 days.

(21) Appl. No.: 16/648,624

(22) PCT Filed: Sep. 19, 2017

(86) PCT No.: PCT/JP2017/033625
§ 371 (c)(1),
(2) Date: Mar. 18, 2020

(87) PCT Pub. No.: WO2019/058409
PCT Pub. Date: Mar. 28, 2019

(65) Prior Publication Data
US 2020/0283867 A1    Sep. 10, 2020

(51) Int. Cl.
*C21D 9/46*    (2006.01)
*C21D 8/02*    (2006.01)
(Continued)

(52) U.S. Cl.
CPC ............ *C21D 9/46* (2013.01); *C21D 8/0226* (2013.01); *C21D 8/0236* (2013.01);
(Continued)

(58) Field of Classification Search
CPC ....................................................... C21D 9/46
See application file for complete search history.

(56) References Cited

U.S. PATENT DOCUMENTS

2004/0197661 A1    10/2004    Utsunomiya et al.
2007/0186999 A1    8/2007    Kuroda et al.
(Continued)

FOREIGN PATENT DOCUMENTS

JP    2004-296381 A    10/2004
JP    3667679 B2    7/2005
(Continued)

OTHER PUBLICATIONS

"Project for Technological Development of Solid Polymer Fuel Cell Systems", Evaluation Report, Sep. 2005, New Energy and Industrial Technology Development Organization (incorporated administrative agency), Department of Development of Fuel Cells and Hydrogen Technologies, total of 9 pages.
(Continued)

*Primary Examiner* — Jophy S. Koshy
(74) *Attorney, Agent, or Firm* — Birch, Stewart, Kolasch & Birch, LLP

(57) ABSTRACT

Provided are a stainless steel sheet with good corrosion resistance, low contact resistance and good press workability without the use of expensive materials such as gold or rare metals, and a method of manufacture the same. A method of manufacturing a stainless steel sheet includes: preparing a slab having a chemical composition including, in mass %: 20 to 26% Cr, up to 0.1% N, up to 2.0% Si, etc. (step S1); performing hot rolling and cold rolling on the slab
(Continued)

to produce a rolled steel sheet with a thickness of 50 to 200 μm (step S2); an annealing step in which the rolled steel sheet is annealed and cooled in a gas atmosphere containing nitrogen (step S3); and pickling the rolled steel sheet after the annealing step with a solution containing a non-oxidizing acid (step S4). The stainless steel sheet has an N content of 0.6 to 2.0% by mass.

5 Claims, 8 Drawing Sheets

(51) Int. Cl.
  *C22C 38/00* (2006.01)
  *C22C 38/18* (2006.01)
  *C23G 1/08* (2006.01)
  *H01M 8/021* (2016.01)
  *H01M 8/1018* (2016.01)
(52) U.S. Cl.
  CPC .......... *C21D 8/0273* (2013.01); *C22C 38/001* (2013.01); *C22C 38/18* (2013.01); *C23G 1/081* (2013.01); *C23G 1/086* (2013.01); *H01M 8/021* (2013.01); *H01M 8/1018* (2013.01); *C21D 2211/001* (2013.01)

(56) References Cited

U.S. PATENT DOCUMENTS

| | | | |
|---|---|---|---|
| 2014/0193668 A1 | 7/2014 | Makiishi et al. | |
| 2014/0338800 A1* | 11/2014 | Leinonen | C22C 38/001 148/567 |

FOREIGN PATENT DOCUMENTS

| | | |
|---|---|---|
| JP | 2006-316338 A | 11/2006 |
| JP | 2010-49980 A | 3/2010 |
| JP | 5120799 B2 | 1/2013 |
| WO | WO 2013/018322 A1 | 2/2013 |
| WO | WO-2013107922 A1 * | 7/2013 ............. C21D 8/005 |

OTHER PUBLICATIONS

International Search Report for PCT/JP2017/033625 (PCT/ISA/210) dated Dec. 19, 2017.
Suzuki et al., "Decrease of Contact Resistance of Noble Metals Element Content Titanium Alloys by Heat-treatment After Pickling", "Reduction in contact resistance due to post-pickling heat treatment of noble-metal-containing titanium alloys", "Titanium" magazine from the Japan Titanium Society, vol. 54 (2006), No. 4, p. 259, total of 9 pages.
Written Opinion of the International Searching Authority for PCT/JP2017/033625 (PCT/ISA/237) dated Dec. 19, 2017.

* cited by examiner

STAINLESS STEEL SHEET AND METHOD OF MANUFACTURING THE SAME, SEPARATOR FOR SOLID POLYMER FUEL CELL, SOLID POLYMER FUEL CELL, AND SOLID POLYMER FUEL CELL BATTERY

TECHNICAL FIELD

The present invention relates to a stainless steel sheet and a method of manufacture the same, a separator for a solid polymer fuel cell, a solid polymer fuel cell, and a solid polymer fuel cell battery.

BACKGROUND ART

A fuel cell generates electricity using energy generated during binding between hydrogen and oxygen. Hopes are put on fuel cells from both energy-saving and environmental viewpoints. Based on the type of electrolyte, fuel cells are categorized as solid-electrolyte type, molten-carbonate type, phosphate type, and solid-polymer type. Solid polymer fuel cells have high output density, and can be miniaturized. Further, they operate at lower temperatures than fuel cells of other types, and can easily be activated and deactivated. This has raised expectations that they can be used in electric vehicles and small home cogeneration systems.

A separator for a solid polymer fuel cell (hereinafter sometimes simply referred to as "separator") is required to provide functions including the following:

(1) serving as a "flow channel" for supplying fuel gases and oxidizing gases uniformly across an electrode surface;

(2) serving as a "flow channel" for efficiently discharging water produced at the cathode from the fuel cell, together with air after reaction and carrier gases such as oxygen;

(3) contacting electrode film to serve as a path for electricity and providing an electrical "connector" between cells;

(4) serving as a "partition" between adjacent cells, particularly between the anode chamber of one cell and the cathode chamber of another cell; and (5) in a water-cooled fuel cell, serving as a "partition" between the coolant channel and an adjacent cell.

Base materials for a separator required to provide such functions are generally categorized as metal-based materials and carbon-based materials.

Metal-based materials include stainless steel, titanium, and carbon steel. A separator made of a metal-based material (hereinafter referred to as "metal separator") is produced by press working, for example. A metal separator has excellent workability, which is specific to metals, such that its thickness can be reduced and light-weight separators can be made, among other advantages. On the other hand, corrosion may occur to cause elution of metal ions or oxidation on the metal surface, which may reduce electric conductivity. Thus, a metal separator may have an increased contact resistance with respect to a gas diffusion layer.

A separator is exposed to an extremely harsh environment. The operation temperature of a cell varies from room temperature to 80° C. or even higher, and, during electricity generation, a potential is applied to the separators. Potential ranges from about zero to about 1 V vs SHE, where the anode and cathode potentials can be different. Since a separator is used in a humidified environment in order to protect a catalyst, it is necessary to reduce elution of harmful metal ions or to prevent corrosion, such as pitting.

To solve these problems, JP 2004-296381 A proposes gold-plating the surface of a metal separator in contact with an electrode.

One proposal attempts to solve the same problems without using an expensive material like gold by coating the surface of a metal separator with spread coating or vapor-deposited carbon. Although this is an effective approach, some components may peel or drop off during press working or stack assembly.

In view of this, proposals have been made that involve deploying high-N-content stainless steel in separator applications. Japanese Patent No. 5120799 discloses a separator that uses, as a basic material, an austenite-based stainless steel with an N content higher than 1.00% by mass and not higher than 2.00% by mass.

Japanese Patent No. 3667679 discloses a separator made of stainless steel for a fuel cell with an electrically conductive layer of ceramic, such as TiN, formed on the surface facing the fuel cell electrode of the fuel cell.

JP 2010-49980 A discloses a separator for a fuel cell including a nitrided layer obtained by nitriding the surface of a material made of stainless steel, the layer extending from the surface of the material in the depth direction.

JP 2006-316338 A describes a method of manufacturing a stainless steel product, where a ferrite-based stainless steel containing, in mass %, 18 to 24% Cr and 0 to 4% Mo is brought into contact with an inert gas containing nitrogen gas at 800° C. or higher to allow the steel to absorb nitrogen.

WO 2013/018322 teaches subjecting a stainless steel sheet to an electrolytic treatment and an acid treatment in which the sheet is immersed in a pickling solution to produce fine irregularities on the surface to stabilize contact resistance.

DISCLOSURE OF THE INVENTION

JP 2004-296381 A involves gold plating on the surface of stainless steel. Gold is a rare and expensive metal, and thus is problematic from the economical standpoint and in view of the limited amount of resource.

According to Japanese Patent No. 5120799, steel is smelted by the pressure electro-slag remelting (ESR) process using at least 1 atm nitrogen pressure, that is, a high-N-content stainless steel is produced while still being in the form of an ingot (or slab). The high-N-content stainless steel has high strength and thus requires high deformation, making it difficult to produce a thin sheet. It is especially difficult to achieve a thickness of about 100 μm, which is considered suitable for a steel sheet for a separator. According to Japanese Patent No. 5120799, a sheet with a thickness of 5 mm is machined to achieve a separator shape.

Methods for manufacturing separators by machining a slab or thick plate of high-strength stainless steel, which has high strength and is difficult to machine, are not suitable for mass production and not economical. Further, even when a thin steel sheet can be obtained by using cold rolling, the cold rolling produces work distortion that needs to be relieved by an annealing process, during which nitrides precipitate, reducing ductility. It is difficult to achieve a separator shape by performing press-forming on the thus-obtained steel sheet.

To address the issue of contact resistance, techniques have been proposed to form an electrically conductive nitride layer on the surface of a stainless steel sheet through a post-process, such as the techniques of Japanese Patent No. 3667679 and JP 2010-49980. However, these techniques are problematic in terms of productivity as they involve vapor deposition or plasma nitriding, which are high-cost processes.

Another consideration is that, in a fuel cell's operational state (i.e., state of low output/load), the separator may be exposed to a high potential, which may cause transpassive corrosion of the stainless steel. Transpassive corrosion is caused by $Cr_2O_3$, which constitutes part of the passivity film, being dissolved by a reaction expressed in the following formula:

$$Cr_2O_3 + 5H_2O \rightarrow 2HCrO_4^- + 8H^+ + 6e^-$$

To reduce transpassive corrosion, it is effective to include Si in stainless steel. On the other hand, Si deteriorates the workability of stainless steel, and, in addition, a high Si content makes the stainless steel difficult to austenitize. Thus, in a separator that requires precision machining or a separator intended to have high corrosion resistance by virtue of an austenitized microstructure, it is difficult to reduce transpassive corrosion by increasing Si content.

Thus, no technique has been proposed that could provide corrosion resistance, including resistance to transpassive corrosion, as well as low contact resistance and good press workability without the use of expensive materials such as gold or rare metals. An object of the present invention is to provide a stainless steel sheet with good corrosion resistance, low contact resistance and good press workability without the use of expensive materials such as gold or rare metals, and a method of manufacturing the same.

A method of manufacturing a stainless steel sheet disclosed herein includes: preparing a slab having a chemical composition of, in mass %: 20 to 26% Cr; up to 0.1% N; up to 2.0% Si; up to 0.040% C; up to 0.030% P; up to 0.030% S; up to 1.5% Mn; up to 0.50% Cu; up to 0.50% Mo; up to 0.10% Ni; lower than 50 ppm Ca; lower than 300 ppm sol. Al; and balance Fe and impurities; performing hot rolling and cold rolling on the slab to produce a rolled steel sheet with a thickness of 50 to 200 μm; an annealing step in which the rolled steel sheet is annealed and cooled in a gas atmosphere containing nitrogen; and pickling the rolled steel sheet after the annealing step with a solution containing a non-oxidizing acid. The stainless steel sheet has an N content of 0.6 to 2.0% by mass.

A stainless steel sheet disclosed herein has a chemical composition of, in mass %: 20 to 26% Cr; 0.6 to 2.0% N; up to 2.0% Si; up to 0.040% C; up to 0.030% P; up to 0.030% S; up to 1.5% Mn; up to 0.50% Cu; up to 0.50% Mo; up to 0.10% Ni; lower than 50 ppm Ca; lower than 300 ppm sol. Al; and balance Fe and impurities, the stainless steel sheet having a thickness of 50 to 200 μm, a microstructure being an austenite single phase, an average crystal grain size of austenite crystal grains being one half or less of a thickness of the stainless steel sheet, wherein Cr, Fe and N contents obtained by glow discharge optical emission spectroscopy of a surface of the stainless steel sheet, as determined by an analysis along a depth direction of a sputter-depth range of 0 to 0.5 μm, satisfy the following expressions, (1) and (2):

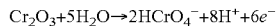

$$0.1 \leq Cr/Fe \leq 0.5 \quad (1), \text{ and}$$

$$Cr/N \leq 1.8 \quad (2),$$

where for Cr, Fe and N in Expressions (1) and (2) are substituted the Cr, Fe and N contents, in atomic percentage, obtained by glow discharge optical emission spectroscopy of the surface of the stainless steel sheet.

The present invention provides a stainless steel sheet with good corrosion resistance, low contact resistance and good press workability without the use of expensive materials such as gold or rare metals.

EMBODIMENTS FOR CARRYING OUT THE INVENTION

Figure 1:
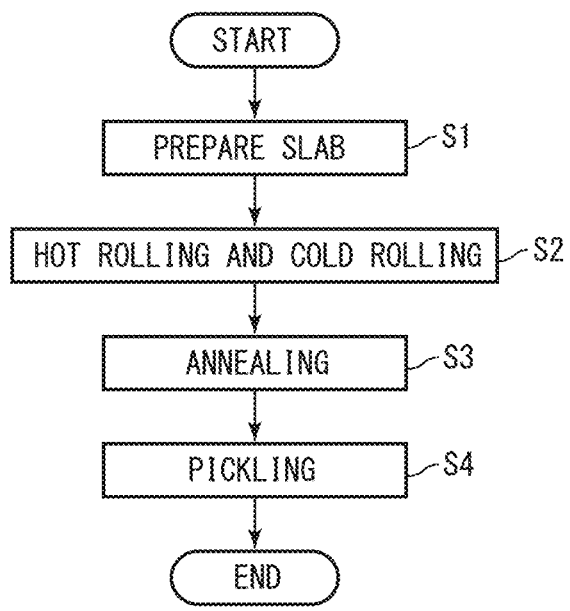
FIG. 1 is a flow chart showing a method of manufacturing a stainless steel sheet according to an embodiment of the present invention.

The present inventors conducted various investigations to solve the above-stated problems. The investigations can be summarized as the following points, (1) to (3).

(1) Corrosion Resistance

A separator for a solid polymer fuel cell preferably has a thickness of about 100 μm. A corrosion-resistant stainless steel is often defined as a stainless steel with a corrosion rate of 0.1 mm/year or lower. If this definition is applied to a separator, even a stainless steel that is considered corrosion-resistant may be corroded/dissolved at 100 μm per year, which may cause a hole to be formed in the separator. Further, among the components forming stainless steel, Fe and Ni ions are known to be likely to reduce the oxygen reduction rate at the interface between a platinum catalyst and polymer electrolyte film ("Project for Technological Development of Solid Polymer Fuel Cell Systems", Evaluation Report, [online], September 2005, New Energy and Industrial Technology Development Organization (incorporated administrative agency), Department of Development of Fuel Cells and Hydrogen Technologies, [retrieved in September 2017], Internet <URL:www.nedo.go.jp/content/100086749.pdfk). Although stainless steel is usually categorized as a corrosion-resistant material, separator applications require materials that exhibit little elution of constituent metal ions.

(2) Balance Between Corrosion Resistance and Economy

To realize a separator with no Ni elution, a ferrite-based stainless steel that contains no Ni may be used in a separator. However, since Fe—Cr-based stainless steel does not contain Ni, an element that improves corrosion resistance, it has a low pitting potential, which may cause pitting under the presence of chlorine ions. To improve corrosion resistance, types of steel obtained by adding Mo to Fe—Cr-based stainless steel, such as SUS 444, may be used. However, since Mo is a rare metal and expensive, their advantages over austenite-based stainless steels (for example, SUS 304, which contains no Mo) are less prominent from the economical standpoint. It is desirable to achieve high corrosion resistance without adding Mo.

(3) How to Ensure Workability

To industrially manufacture steel sheets with a thickness of about 100 μm, the steel needs to have good workability. However, ferrite-based stainless steel has poor ductility (normally capable of being elongated by less than 30%), and is difficult, by means of press working, to form a separator with channels that are complicated in shape.

To solve this problem, the present inventors found an approach whereby an Fe—Cr-based stainless steel with low Ni content is used to produce a steel sheet, which is then allowed to absorb nitrogen to austenitize the microstructure. This improves the corrosion resistance of the stainless steel sheet without the use of expensive materials such as Mo. Further, austenitizing the microstructure ensures good press workability.

Passivity film that forms on the surface of a stainless steel sheet, mainly composed of $Cr_2O_3$, has the function of increasing corrosion resistance, but is a contributing factor to high resistance. The present inventors found that a steel sheet may be allowed to absorb nitrogen, as discussed above, to austenitize the microstructure and be pickled with a solution containing a non-oxidizing acid to form a Cr-nitride layer providing both electrical conductivity and corrosion resistance on the surface of the stainless steel sheet. This will achieve low contact resistance while maintaining corrosion resistance. This method, which uses Cr nitrides derived from the raw material, is also more economical than methods of forming a nitride layer by vapor deposition or plasma nitriding. Further, unlike $Cr_2O_3$, this Cr-nitride layer is not easily dissolved even at high potentials. This will reduce transpassive corrosion, which is a pending problem with stainless-steel separators.

The present invention was made based on these findings. Now, a stainless steel sheet and a method of manufacturing it, a separator for a solid polymer feel cell, a solid polymer fuel cell and a solid polymer fuel cell battery according to embodiments of the present invention will be described in detail.

[Stainless Steel Sheet]

[Chemical Composition]

A stainless steel sheet according to an embodiment of the present invention has a chemical composition as described below. In the following description, "%" for the amounts of the elements means mass percentage.

Cr: 20 to 26%

Chromium (Cr) has the effect of forming a $Cr_2O_3$ passivity film on the surface of stainless steel to improve corrosion resistance. A lower limit for Cr content is to be 20%. With less than 20% Cr, a microstructure that has been austenitized may contain a martensite phase. On the other hand, as Cr content increases, deformation resistance increases. An upper limit for Cr content is to be 26% in order to ensure stable manufacturability of steel sheets of about 100 μm using cold rolling and other steps in an industrial manufacturing process. A lower limit for Cr content is preferably 23%. With less than 23% Cr, the high deformation may produce a work-derived martensite phase. An upper limit for Cr content is preferably 25%. This is to ensure more stable manufacturability (particularly, flatness of steel sheets).

N: 0.6 to 2.0%

Nitrogen (N) has the effect of improving corrosion resistance when added in an amount that does not produce nitrides in stainless steel. Further, N is an element that promotes austenitization of stainless steel. A lower limit for N content is to be 0.6%. This is to provide the minimum amount of nitrogen required to obtain an austenite phase on an Fe—Cr—N basis. An upper limit for N content is to be 2.0%. This is to prevent production of nitrides, such as $Cr_2N$ or CrN, within crystal grains. A lower limit for N content is preferably 0.8%. An upper limit for N content is preferably 1.6%.

Si: up to 2.0%

Silicon (Si) does not need to be contained. Usually, Si is not intentionally added since Si deteriorates the workability of stainless steel. On the other hand, Si may be added to stainless steel to be used in a strongly oxidizing environment, such as thick nitric acid. When stainless steel is exposed to an environment capable of causing transpassive corrosion, Si forms $SiO_2$ on the surface, which serves as a coating that exhibits the effect of protecting the $Cr_2O_3$ passivity film. Accordingly, Si may be added to a steel that may be exposed to an environment that is particularly likely to cause transpassive corrosion. If Si is to be added, an upper limit for Si content is to be 2.0%. If the Si content exceeds 2.0%, this may deteriorate workability or cause a brittle σ phase to precipitate during manufacture, potentially leading to cracking during the process for forming a steel sheet or resulting in a shape with low flatness and not suitable for press working. An upper limit for Si content is preferably 1.5%.

C: up to 0.040%

Carbon (C) does not need to be contained. C is a solution-strengthening element that contributes to the improvement of the strength of stainless steel. However, if the C content is high, large numbers of carbide particles are produced during manufacture and present initiation points for fractures, thus deteriorating the formability of steel. In view of this, the C content is to be not higher than 0.040%. An upper limit for C content is preferably 0.030%.

P: up to 0.030%

Phosphor (P) is an impurity. P segregates on grain boundaries during solidification, increasing solidification cracking susceptibility. Accordingly, the lower the P content, the better. In view of this, the P content is to be not higher than 0.030%.

S: up to 0.030%

Sulfur (S) is an impurity. S segregates on grain boundaries during solidification, increasing solidification cracking susceptibility. Accordingly, the lower the S content, the better. In view of this, the S content is to be not higher than 0.030%.

Mn: up to 1.5%

Manganese (Mn) does not need to be contained. Mn prevents the S-induced reduction in hot workability. Mn further deoxidizes stainless steel. However, high Mn contents promote precipitation of an intermetallic compound phase, such as σ phase. Precipitation of a σ phase decreases microstructure stability and decreases the toughness and ductility of stainless steel. In view of this, the Mn content is to be not higher than 1.5%. An upper limit for Mn content is preferably 1.0%, and more preferably 0.5%.

Cu: up to 0.50%

Copper (Cu) does not need to be contained. Cu can easily segregate on grain boundaries, and is an austenite-stabilizing element. High Cu contents prevent the production of ferrite during solidification during casting, increasing solidification cracking susceptibility. Further, high Cu contents may reduce hot workability. In view of this, the Cu content is to be not higher than 0.50%.

Mo: up to 0.50%

Molybdenum (Mo) does not need to be contained. Mo has the effect of increasing the corrosion resistance of stainless steel. However, Mo is an expensive element that is categorized as a rare metal, and is not preferable if an economical material is to be provided. Further, if the Mo content is high, a microstructure with an austenite single phase may not be obtained. In view of this, the Mo content is to be not higher than 0.50%. An upper limit for Mo content is preferably 0.30%.

Ni: up to 0.10%

Nickel (Ni) does not need to be contained. Ni is an element that promotes austenitization of stainless steel. However, Ni is categorized as a rare metal, and is not preferable if an economical material is to be provided. Further, elution of Ni ions may decrease the oxygen reaction rate at the interface between a platinum catalyst and polymer electrolyte film. In view of this, the Ni content is to be not higher than 0.10%.

Ca: lower than 50 ppm

Calcium (Ca) is an impurity. Generally known non-metal inclusions that may present initiation points for corrosion of stainless steel include CaS and MnS. To prevent production of large amounts of CaS that may present initiation points for corrosion, the Ca content is to be lower than 50 ppm.

sol. Al: lower than 300 ppm

Aluminum (Al) does not need to be contained. Al deoxidizes stainless steel. However, if the Al content is excessively high, the index of cleanliness of the steel decreases, which decreases the workability and ductility of the stainless steel. In view of this, the Al content is to be lower than 300 ppm. Al content as used herein means the content of acid-soluble Al (sol. Al).

The balance of the chemical composition of the stainless steel sheet according to the present embodiment is Fe and impurities. Impurity as used herein means an element originating from ore or scrap used as raw material for steel or an element that has entered from the environment or the like during the manufacturing process.

[Sheet Thickness]

The stainless steel sheet according to the present embodiment has a thickness of 50 to 200 μm.

[Microstructure and Average Grain Size of Austenite Crystal Grains]

The microstructure of the stainless steel sheet according to the present embodiment is an austenite single phase. As the microstructure is an austenite single phase, good press workability (i.e. ductility) is obtained.

In the stainless steel sheet according to the present embodiment, the average grain size of austenite crystal grains (hereinafter referred to as "γ-grain size") is not larger than one half of the thickness of the stainless steel sheet. If γ grains coarsen in size, good press workability may not be obtained. For example, if one crystal grain is present as counted along the sheet-thickness direction, uniform deformation during press working cannot be achieved, resulting in poor press workability. Preferably, the γ-grain size is not larger than one third of the thickness of the stainless steel sheet.

γ-grain size is measured in the following manner: a microstructure photograph with a known magnification is prepared and a line of a predetermined length is drawn thereon; the number of austenite crystal grains on the line is counted; a crystal grain on each end of the line is treated as one half, the length of the line divided by the number of crystal grains on the line is treated as the grain size of austenite crystal grains in this particular microstructure photograph; five microstructure photographs for an L cross section and five microstructure photographs for a T cross section, both at a magnification of 50, are taken and, for these ten microstructure photographs in total, the grain size of austenite crystal grains is measured by the above-discussed method and their average is treated as γ-grain size.

[Cr, Fe and N Contents Near Surface]

In the stainless steel sheet according to the present embodiment, the Cr, Fe and N contents obtained by glow discharge optical emission spectroscopy of the surface of the stainless steel, as determined by an analysis along a depth direction of a sputter-depth range of 0 to 0.5 μm, satisfy the following expressions, (1) and (2):

$$0.1 \leq Cr/Fe \leq 0.5 \quad (1), \text{ and}$$

$$Cr/N \leq 1.8 \quad (2).$$

For Cr, Fe and N in Expressions (1) and (2) are substituted the Cr, Fe and N contents, in atomic percentage, obtained by glow discharge optical emission spectroscopy of the surface of the stainless steel sheet.

"As determined by an analysis along a depth direction of a sputter-depth range of 0 to 0.5 μm, satisfy the following expressions, (1) and (2)" means that Expressions (1) and (2) are satisfied for all the measurement points within the range of 0 to 0.5 μm. The region in the range of 0 to 0.5 μm directly affects the contact resistance and corrosion resistance of a separator. The region in the range of 0 to 0.5 μm from the surface will be hereinafter referred to as "portions near the surface".

The distribution of Cr, Fe and N contents in the portions near the surface is determined by using glow discharge optical emission spectroscopy (GD-OES) for analysis while performing sputtering in the depth direction beginning at the surface. The glow discharge optical emission spectroscopy may use, for example, a Marcus-type high-frequency glow discharge emission spectroscopic analyzer from Horiba, Ltd. (GD-Profiler 2). The obtained distribution along the depth direction is converted to atom ratio to calculate Cr/Fe and Cr/N.

Cr/Fe in Expression (1) is an indicator of Cr concentration. If Cr/Fe in the portions near the surface is larger than the value in the bulk composition of a stainless steel sheet (0.26 to 0.39), this means that the portions near the surface are rich with Cr. Good corrosion resistance is not obtained if Cr/Fe in the portions near the surface is excessively high or excessively low. In view of this, Cr/Fe in the portions near the surface is to be 0.1 to 0.5. A lower limit for Cr/Fe in the portions near the surface is preferably 0.2. An upper limit for Cr/Fe in the portions near the surface is preferably 0.4.

Cr/N in Expression (2) is an indicator of the ratio of CrN to $Cr_2N$. The larger the amount of $Cr_2N$ present in the portions near the surface, the higher the Cr/N value becomes. Since CrN has good corrosion resistance while $Cr_2N$ has poor corrosion resistance, smaller amounts of $Cr_2N$ are preferable. In view of this, Cr/N in the portions near the surface is to be not larger than 1.8. Cr/N in the portions near the surface is preferably not larger than 1.5.

[Mechanical Properties]

The stainless steel sheet according to the present embodiment has good press workability. The amount by which the stainless steel sheet according to the present embodiment can be elongated by tensile testing (i.e., breaking elongation) is preferably not smaller than 15%, and more preferably not smaller than 20%. The tensile testing complies with ASTM A370 and is performed at a strain rate of $1 \times 10^{-3}$/s.

[Method of Manufacturing Stainless Steel Sheet]

FIG. 1 is a flow chart showing a method of manufacturing a stainless steel sheet according to an embodiment of the present invention. This manufacturing method includes: the step of preparing a slab (step S1); the step of hot-rolling and cold-rolling the slab to produce a rolled steel sheet with a thickness of 50 to 200 μm (step S2); the step of annealing and cooling the rolled steel sheet in a gas atmosphere containing nitrogen (step S3); and the pickling step in which the steel sheet is pickled with a solution containing a non-oxidizing acid (step S4). The steps will now be described in detail.

[Step of Preparing Slab]

A slab is prepared that has a chemical composition of, in mass %: 20 to 26% Cr; up to 0.1% N; up to 2.0% Si; up to 0.040% C; up to 0.030% P; up to 0.030% S; up to 1.5% Mn; up to 0.50% Cu; up to 0.50% Mo; up to 0.10% Ni; lower than 50 ppm Ca; lower than 300 ppm sol. Al; and balance Fe and impurities (step S1).

The chemical composition of this slab is the same as the chemical composition of the stainless steel sheet indicated above except for the N content. The N content for the slab is to be not higher than 0.1%, because an N content above 0.1% would lead to increased deformation resistance, making it difficult to make a steel sheet out of it by rolling. An upper limit for the N content in the slab is preferably 0.05%.

Although not limiting, the step of preparing the slab may include, for example, the following sub-steps.

A raw material is melted. Raw materials that can be used include ferrochrome and ferrosilicon used for manufacturing stainless steel, cast iron, and scrap of ferrite-based stainless steel. The melting is mainly performed by an electric furnace. Laboratory-level melting may be performed by a vacuum induction heating furnace. The material is refined to reduce the amount of carbon, gas components and metal inclusions. The refining may be performed by applying argon-oxygen decarburization (AOD), vacuum-oxygen decarburization (VOD), V-AOD or other methods. Thereafter, the material is cast in continuous-casting equipment or in a case to form a slab with a shape suitable for rolling. The chemical composition of the slab may be adjusted by mixing appropriate raw materials or changing the refining conditions.

[Rolling Step]

The slab is hot rolled and cold rolled to produce a rolled steel sheet with a thickness of 50 to 200 μm (step S2). Hot rolling and cold rolling may be repeated, and an intermediate heat treatment such as annealing or pickling may be performed as necessary. In addition to hot rolling and cold rolling, hot forging or cutting may be performed as necessary.

Although not limiting, the rolling step may include the following sub-steps, for example.

The slab is hot rolled by a tandem mill or a steckel mill to form a hot-rolled coil. The hot-rolled coil is annealed and pickled. The cool is then cold rolled by multi-roll cold rolling mill to produce a rolled steel sheet with a thickness of 50 to 200 μm.

[Annealing Step]

The rolled steel sheet is annealed and cooled in a gas atmosphere containing nitrogen (step S3). This step allows the steel sheet to absorb nitrogen through its surface to austenitize the phase structure of the steel sheet.

The ratio of the partial pressure of nitrogen to the total pressure of the process gas is preferably 0.4 to 0.7. If the ratio of the partial pressure of nitrogen to the total pressure is lower than 0.4, the sheet is not supplied with sufficient nitrogen through its surface and, if the steel sheet has a large thickness, austenitization across the entire thickness is difficult. On the other hand, if the ratio of the partial pressure of nitrogen to the total pressure of the process gas is higher than 0.7, excessive amounts of Cr nitrides are produced on the surface, which may present initiation points for cracking during the working. To prevent the steel sheet from being oxidized, it is preferable that the gas mixed with nitrogen be hydrogen. Instead of hydrogen, or in addition to hydrogen, argon may be used.

The annealing preferably occurs at a temperature of 950 to 1200° C. If the temperature of annealing is lower than 950° C., not only an austenite phase is present in a state of equilibrium, but also a $Cr_2N$ phase, and thus a microstructure with an austenite single phase may not be obtained. On the other hand, if the temperature of annealing exceeds 1200° C., a liquid phase is produced near grain boundaries, particularly if Si is contained, and this phase may melt to cause embrittlement. The temperature of annealing is more preferably 1050 to 1150° C., depending on the Cr content.

The holding time of the annealing is preferably 300 to 900 seconds, depending on the thickness of the steel sheet. If the holding time is shorter than 300 seconds, austenitization across the entire thickness is difficult. On the other hand, if the holding time exceeds 900 seconds, γ grains coarsen and excessive amounts of Cr nitrides may precipitate on the surface. The holding time of the annealing is more preferably 360 to 500 seconds.

The annealed steel sheet is cooled. It is preferable that the annealed steel sheet be quickly cooled. If the annealed steel sheet is gradually cooled, excessive amounts of nitrides may precipitate in the intermediate temperature range. Still, since the steel sheet of the present embodiment has a thickness of 50 to 200 μm and has a small heat capacity, the sheet is cooled sufficiently quickly if it is left to cool outside the furnace. Water cooling or other processes are undesirable because the sheet may be deformed by strains due to rapid cooling.

The annealing step may be performed by, for example, passing the steel sheet through an annealing line called continuous bright annealing line.

This annealing step produces a steel sheet with an austenitized microstructure. The process is adjusted such that the steel sheet after the annealing step has an N content of 0.6 to 2.0% by mass, a microstructure of an austenite single phase, and a γ-grain size of one half of the thickness of the stainless steel sheet or smaller.

The N content in the steel sheet after the annealing step can be adjusted by changing the N content in the slab and the annealing conditions. Specifically, the N content in the steel sheet after the annealing step may be increased by increasing the N content in the slab, increasing the partial pressure of nitrogen during annealing, raising the temperature of annealing, or increasing the holding time of the annealing.

The γ-grain size may be adjusted by changing the annealing conditions. Specifically, the γ-grain size may be reduced by lowering the temperature of the annealing or reducing the holding time.

Figure 2:
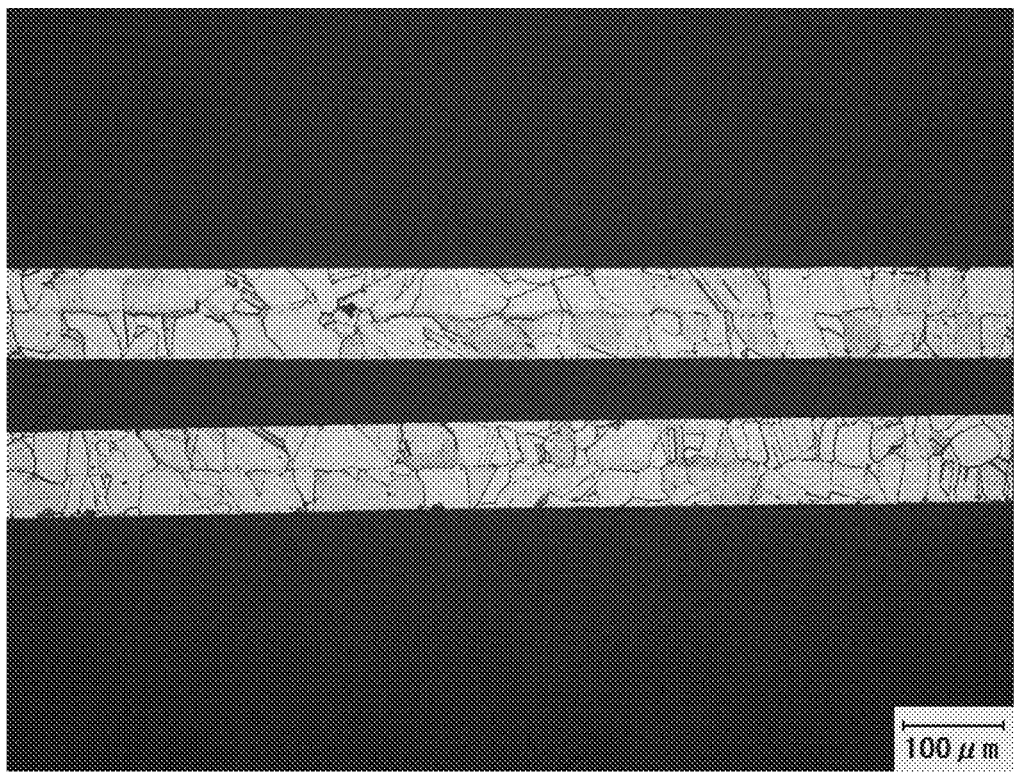
FIG. 2 shows a cross-sectional photomicrograph of a steel sheet obtained from the present embodiment.

FIG. 2 is a cross-sectional photomicrograph of a steel sheet obtained from the present embodiment. During the annealing step, austenitization due to nitrogen absorption starts at the front and back sides of the steel sheet simultaneously, and then progresses. As γ grains that have grown from the front and back sides collide, grain growth stops. The γ-grain size at this time is approximately one half of the sheet thickness.

[Pickling Step]

The steel sheet after the annealing step is pickled with a solution containing a non-oxidizing acid (step S4). The pickling uses a non-oxidizing acid to prevent the surface of the steel sheet from oxidizing. Acids that can be used include, for example, (1) hydrofluoric acid, (2) sulfuric acid, and (3) hydrochloric acid, as well as a mixture of two or more of these acids.

(1) Hydrofluoric Acid

The concentration of hydrochloric acid is preferably 1 to 5% by mass. The process temperature is preferably 35 to 75° C. For temperatures lower than 35° C., the process may be prolonged. Further, it may happen in the summer that the temperature rise due to the heat generation during pickling cannot be controlled to a sufficient degree and the process may be affected by the ambient temperature, making stable processing impossible. On the other hand, for temperatures higher than 75° C., corrosive fumes may be generated in the process liquid. The process temperature is more preferably 40 to 55° C. The process time is preferably 5 to 10 minutes.

(2) Sulfuric Acid

The concentration of sulfuric acid is preferably 10 to 40% by mass. The process temperature is preferably 35 to 75° C. For temperatures lower than 35° C., the process may be prolonged. Further, it may happen in the summer that the temperature rise due to the heat generation during pickling cannot be controlled to a sufficient degree and the process may be affected by the ambient temperature, making stable processing impossible. On the other hand, for temperatures higher than 75° C., harmful $SO_x$ gases may be generated in the process liquid. The concentration is more preferably 15 to 30% by mass. The process temperature is more preferably 50 to 60° C. The process time is preferably 5 to 10 minutes.

(3) Hydrochloric Acid

The concentration of hydrochloric acid is preferably 4 to 15% by mass. The process temperature is preferably 35 to 75° C. For temperatures lower than 35° C., the process may be prolonged. Further, it may happen in the summer that the temperature rise due to the heat generation during pickling cannot be controlled to a sufficient degree and the process may be affected by the ambient temperature, making stable processing impossible. On the other hand, for temperatures higher than 75° C., corrosive fumes may be generated in the process liquid. The concentration is more preferably 4 to 12% by mass. The process temperature is more preferably 40 to 55° C. The process time is preferably 5 to 15 minutes.

The method of manufacturing a stainless steel sheet according to an embodiment of the present invention has been described. According to the present embodiment, Fe—Cr-based stainless steel is formed into a steel sheet, which is then allowed to absorb nitrogen to austenitize the microstructure. This will improve the corrosion resistance of the stainless steel sheet without the use of expensive materials such as Mo. Further, austenitizing the microstructure will ensure good press workability.

According to the present embodiment, the N content of the slab is not higher than 0.1%, which makes it relatively easy to obtain a rolled steel sheet. Further, since a steel sheet with a thickness of 50 to 200 μm is formed before being allowed to absorb nitrogen, austenitization is achieved in a relatively short period of time.

Further, according to the present embodiment, the steel sheet after the annealing step is pickled with a solution containing a non-oxidizing acid, thereby forming, on the surface, a Cr-nitride layer that provides both electric conductivity and corrosion resistance. This Cr-nitride layer will be described in detail below.

Figure 3:
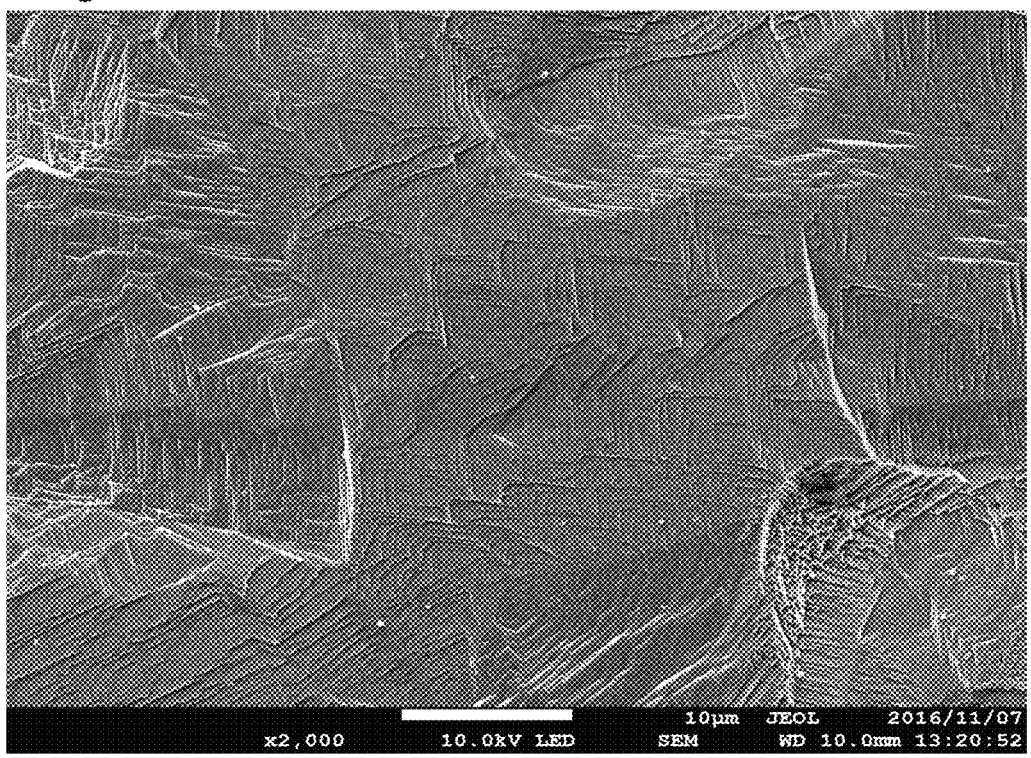
FIG. 3 shows an SEM image of the surface of the steel sheet after the pickling step.

FIG. 3 is a scanning electron microscopy (SEM) photograph of the surface of the steel sheet after the pickling step. It can be recognized from FIG. 3 that the surface of the steel sheet has a terrace-shaped structure.

Figure 4A:
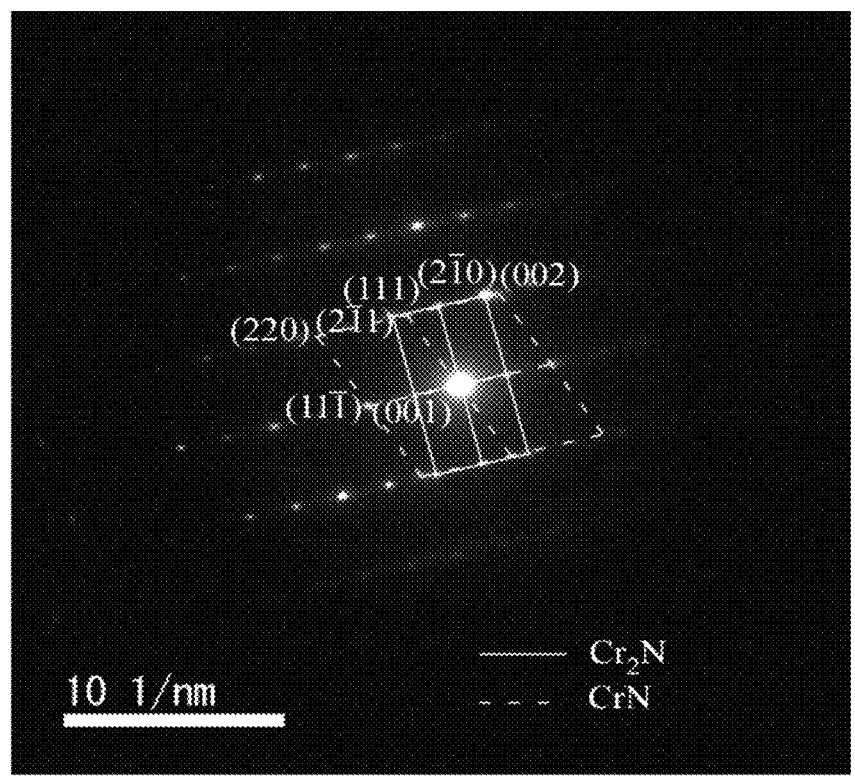
FIG. 4A shows an electron diffraction image of the steel sheet after the pickling step.
Figure 4B:
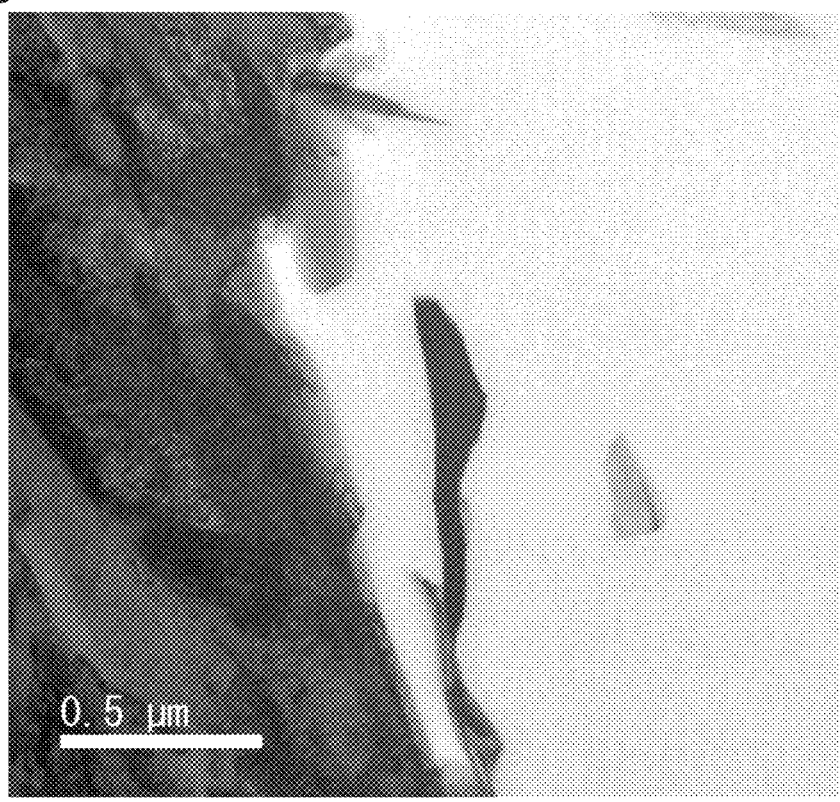
FIG. 4B shows a TEM image (bright field) of the steel sheet after the pickling step.
Figure 4C:
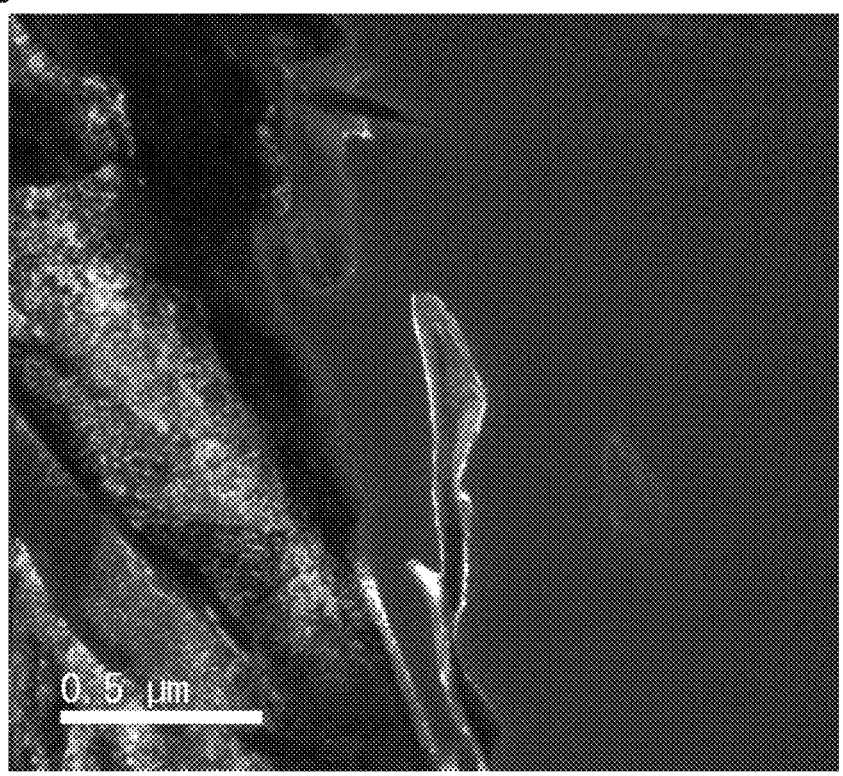
FIG. 4C shows a TEM image (dark field) of the steel sheet after the pickling step.

FIG. 4A shows an electron diffraction image of the surface of the steel sheet after the pickling step obtained by transmission electron microscopy (TEM), and FIG. 4B shows an image of a bright field while FIG. 4C shows an image of a dark field. It can be recognized from FIG. 4A (electron diffraction image) that the terrace-shaped structure is derived from $Cr_2N$ and CrN. Further, it can be recognized from FIG. 4C (dark-field image) that the surface is coated with CrN.

Figure 5A:
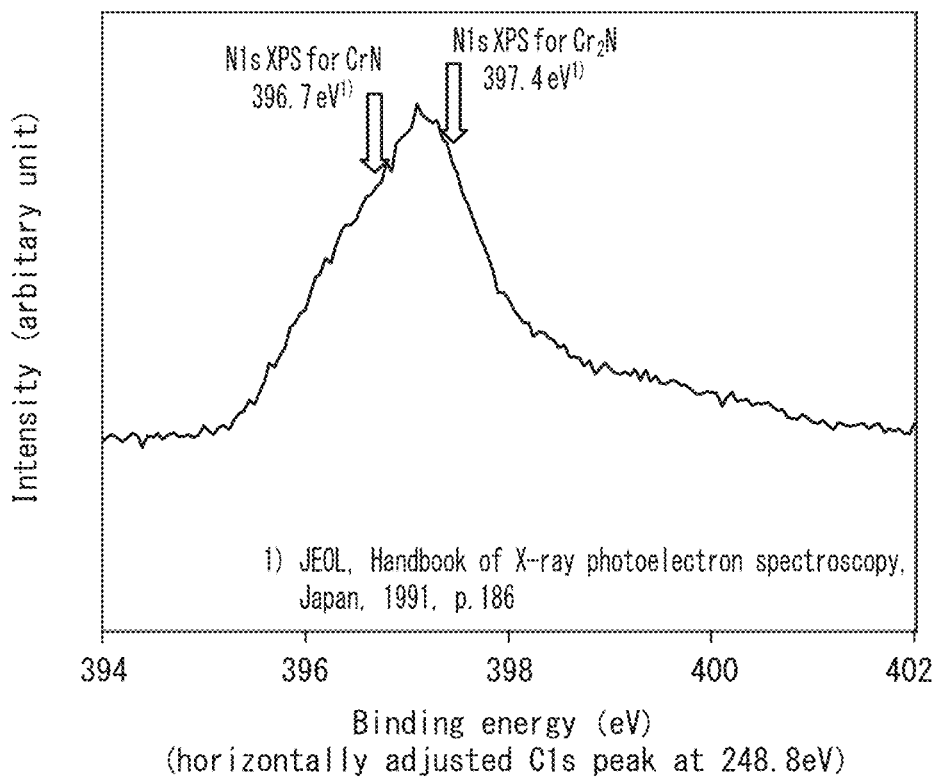
FIG. 5A shows results of analysis by XPS of the surface of the steel sheet after the pickling step.
Figure 5B:
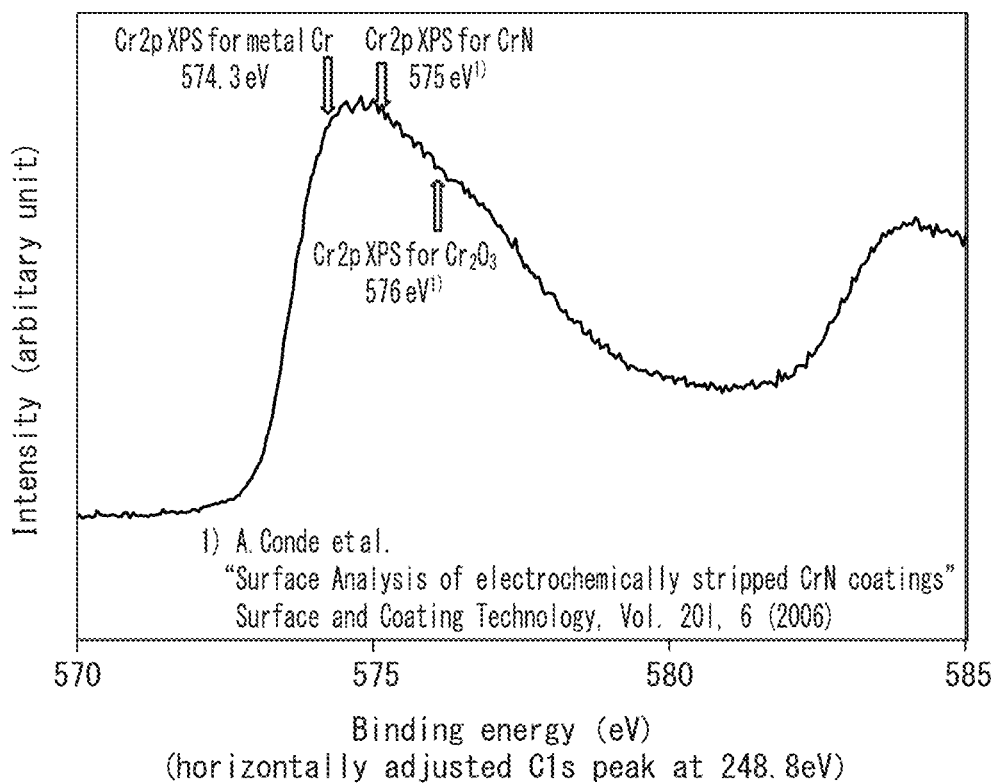
FIG. 5B shows results of analysis by XPS of the surface of the steel sheet after the pickling step.

FIGS. 5A and 5B show results of analysis by X-ray photoelectron spectroscopy (XPS) of the surface of the steel sheet after the pickling step. The values of the binding energy of N1s (FIG. 5A) and the binding energy of Cr2p (FIG. 5B) show that CrN and $Cr_2N$ coexist. Further, the values of the binding energy of Cr2p (FIG. 5B) show the presence of $Cr_2O_3$.

Figure 6A:
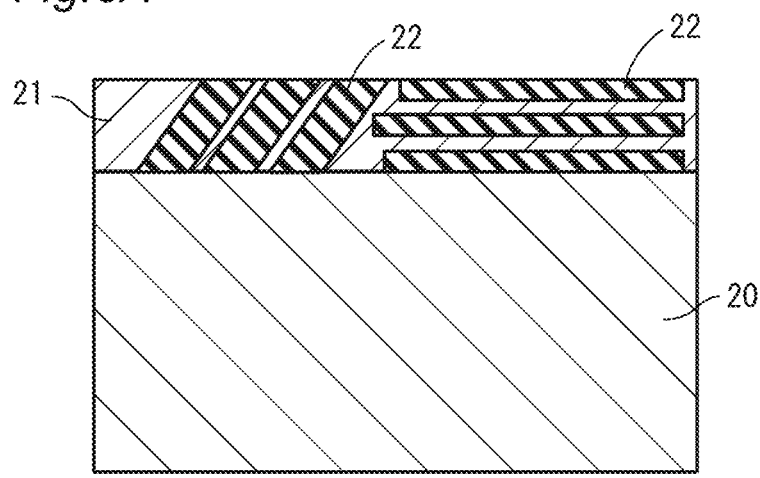
FIG. 6A is a schematic cross-sectional view of the surface and nearby portions of the steel sheet after the annealing step.

This information suggests that the Cr-nitride layer is formed in the following manner. FIG. 6A is a schematic cross-sectional view of the surface and nearby portions of the steel sheet after the annealing step. Since nitride is absorbed by the steel sheet through its surface during annealing, large amounts of nitrogen are present on the surface. As such, an α' phase 21 and Cr nitrides (CrN, $Cr_2N$) are present on the high-N-content austenite phase 20. The Cr nitrides precipitate in the form of a lamellar structure 22 of CrN and $Cr_2N$.

Figure 6B:
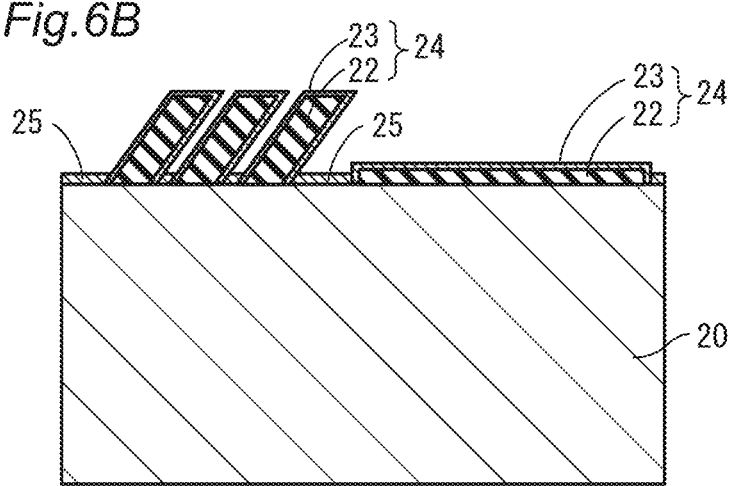
FIG. 6B is a schematic cross-sectional view of the surface and nearby portions of the steel sheet after the pickling step.

FIG. 6B is a schematic cross-sectional view of the surface and nearby portions of the steel sheet after the pickling step. The pickling selectively removes the α' phase 21 and $Cr_2N$, which have poor corrosion resistance, such that CrN 23 remains on the outermost surface. This results in a Cr-nitride layer 24 in which the CrN 23 serves as a coating that protects the lamellar structure 22. The pickling also forms a thin $Cr_2O_3$ layer 25 on the high-N-content austenite phase 20.

The surface of the steel sheet after the pickling has the following characteristics:

a terrace-shaped surface geometry, as the structures with low corrosion resistance have been selectively removed;

composed of $Cr_2N$+CrN coated with CrN and a thin $Cr_2O_3$ layer; CrN and $Cr_2O_3$ present on the outermost surface are compounds with good corrosion resistance, which contributes to high corrosion resistance; and $Cr_2N$ and CrN are electrically conductive materials that contribute to low contact resistance.

Table 1 shows physical properties of CrN, $Cr_2N$ and other materials. As shown in Table 1, $Cr_2N$ and CrN have overwhelmingly lower electrical resistances than $Cr_2O_3$. Further, CrN, present on the outermost surface, is thought to be corrosion-resistant against transpassive corrosion and contributes to reduction of transpassive corrosion.

TABLE 1

| Material name | Electric resistivity (μΩcm) | Corrosion resistance (25% sulfuric acid resistance) | Transpassive corrosion resistance |
|---|---|---|---|
| Ti | 55 | corrodible | — |
| SUS 316 | 74 | corrodible | — |
| TiC | 52* | — | — |
| CrN (cubic) | 640* | corrosion-resistant*** | oxidized at transpassive potential*** |
| $Cr_2N$ | 84* | corrodible*** | — |
| $Cr_2O_3$ | $1.3 \times 10^9$** | corrosion-resistant | — |

*H. Hollek, Material selection for hard coating, V. Vac. Sci. Technol. A, Vol. 4, No. 6, November/December 1986
**The Chemical Society of Japan (ed.), Chemistry Handbook - Basics, revised fifth edition, Maruzen (2005), p. II-612
***Taguchi et al., Corrosion resistance of chromium in sulfuric acid solution and effects of surface nitriding, Journal of the Japan Institute of Metals and Materials, Vol. 55, No. 2 (1991), p. 204-210

Providing such an Cr-nitride layer provides a stainless steel sheet providing both electric conductivity and corrosion resistance. This geometry of Cr nitrides cannot be achieved by a material obtained by casting in a pressurized nitrogen atmosphere.

Cr/Fe and Cr/N in Expressions (1) and (2) also serve as indicators of the geometry of this Cr-nitride layer. That is, the larger the amounts of Cr nitrides ($Cr_2N$ and CrN), the richer with Cr the surface becomes, increasing the value of Cr/Fe in the portions near the surface. Further, the smaller the amount of $Cr_2N$ relative to CrN, the smaller the value of Cr/N becomes.

Thus, the value of Cr/Fe can be increased by, for example, increasing the N content in the slab, increasing the partial pressure of nitrogen during annealing, raising the temperature of the annealing, or increasing the holding time of the annealing. Further, the value of Cr/N may be reduced by, for example, raising the process temperature of the pickling or increasing the process time of the pickling.

[Separator for Solid Polymer Fuel Cell]

A separator for a solid polymer fuel cell according to an embodiment of the present invention includes a stainless steel sheet according to the above-described embodiment. More specifically, the separator for a solid polymer fuel cell according to the present embodiment is a stainless steel sheet according to the above-described embodiment that is provided with patterned concaves and convexes that can function as flow channels and other features. The separator for a solid polymer fuel cell according to the present embodiment can be produced by performing press working on the stainless steel sheet according to the above-described embodiment.

[Solid Polymer Fuel Cell and Solid Polymer Fuel Cell Battery]

A solid polymer fuel cell according to an embodiment of the present invention includes a separator for a solid polymer fuel cell according to the above-described embodiment. A solid polymer fuel cell battery according to an embodiment of the present invention includes a plurality of solid polymer fuel cells according to the above-mentioned embodiment.

Figure 7:
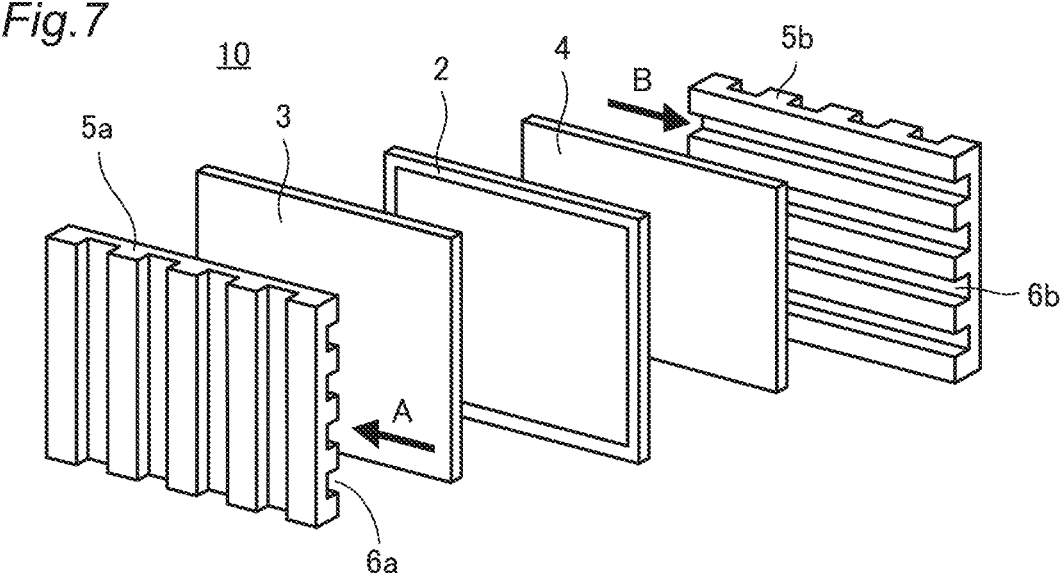
FIG. 7 is an exploded perspective view of an example of the solid polymer fuel cell.
Figure 8:
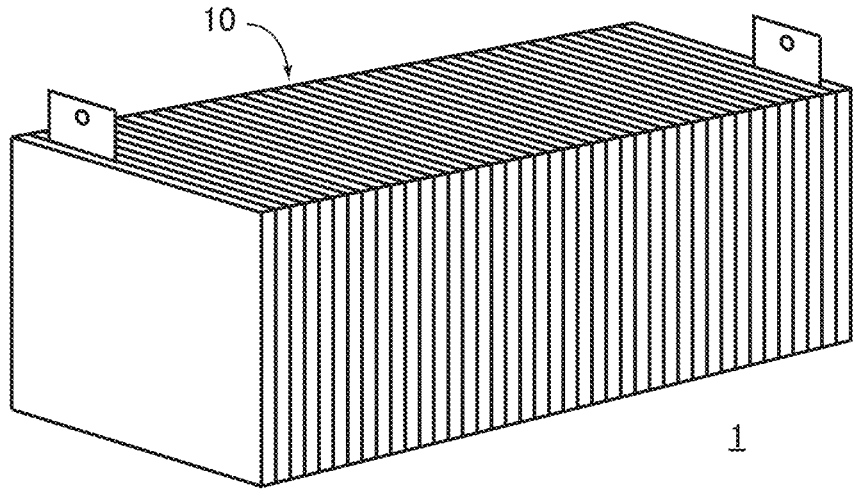
FIG. 8 is a perspective view of an assembly of a plurality of cells, i.e., a solid polymer fuel cell battery.

FIG. 7 is an exploded perspective view of a cell 10, which is an example of the solid polymer fuel cell. FIG. 8 is a perspective view of an assembly (or stack) of a plurality of cells 10, i.e., a solid polymer fuel cell battery 1. The cell 10 of FIG. 7 and the solid polymer fuel cell battery 1 of FIG. 8 are exemplary only, and the solid polymer fuel cell and solid polymer fuel cell battery according to the embodiments are not limited to these constructions.

As shown in FIG. 7, the cell 10 is constructed such that an anode (i.e. anode gas diffusion electrode layer or fuel cell electrode film) 3 is stacked on one side of a solid polymer electrolyte film 2 and a cathode (i.e., cathode gas diffusion electrode layer or oxide electrode film) 4 is on the other side, and separators 5a and 5b are stacked on the sides of the stack.

The separator for a solid polymer fuel cell according to an embodiment may be a separator with flow channels for coolant (i.e. water separator). The solid polymer fuel cell battery according to an embodiment may be a water-cooling fuel cell battery in which a water separator is provided between adjacent cells or between adjacent cell groups, each group consisting of a plurality of cells.

The solid polymer electrolyte film 2 may be a fluorine-based proton-conductive film having a hydrogen-ion-exchange group. The anode 3 and cathode 4 may be each provided with a catalyst layer made of platinum catalyst particles and graphite powder and, if necessary, a fluorine resin having a hydrogen-ion-exchange group. In such implementations, fuel gases or oxidizing gases contact this catalyst layer to promote reaction.

The separator 5a is provided with flow channels 6a. Fuel gases (hydrogen or hydrogen-containing gases), indicated by A, flow through the flow channels 6a to supply hydrogen to the anode 3. The separator 5b is provided with flow channels 6b. Oxidizing gases B, such as air, flow through the flow channels 6b to supply oxygen to the cathode 4. The hydrogen and oxygen thus supplied cause an electrochemical reaction to generate direct current.

Examples

The present invention will now be described in more detail with reference to examples. The present invention is not limited to these examples.

[Manufacture of Rolled Steel Sheet]

Steels of the eight chemical compositions shown in Table 2 were melted in a 30 kg vacuum-melting furnace using high-frequency induction heating, thus producing slabs.

TABLE 2

| Mark | Chemical composition (in % by mass, balance Fe and impurities) | | | | | | | | | | | | Category |
|---|---|---|---|---|---|---|---|---|---|---|---|---|---|
| | C | Si | Mn | P | S | Cu | Cr | Ni | Mo | sol. Al | N | Ca | |
| Material 1 | 0.022 | 0.350 | 0.38 | 0.022 | 0.001 | 0.45 | 19.38 | 0.06 | 0.11 | 0.010 | 0.025 | 0.0004 | low Cr |
| Material 2 | 0.020 | 0.400 | 0.35 | 0.015 | 0.001 | 0.45 | 20.23 | 0.04 | 0.14 | 0.025 | 0.015 | 0.0003 | |
| Material 3 | 0.018 | 1.496 | 0.48 | 0.018 | 0.002 | 0.30 | 22.81 | 0.03 | 0.18 | 0.025 | 0.015 | 0.0004 | |
| Material 4 | 0.022 | 0.450 | 0.41 | 0.019 | 0.001 | 0.32 | 23.53 | 0.04 | 0.08 | 0.002 | 0.014 | 0.0006 | |
| Material 5 | 0.040 | 0.320 | 0.28 | 0.023 | 0.001 | 0.04 | 24.65 | 0.04 | 0.11 | 0.008 | 0.008 | 0.0003 | |
| Material 6 | 0.030 | 0.290 | 0.29 | 0.021 | 0.001 | 0.02 | 25.80 | 0.05 | 0.09 | 0.011 | 0.005 | 0.0002 | |
| Material 7 | 0.022 | 0.150 | 0.10 | 0.018 | 0.002 | 0.15 | 26.50 | 0.08 | 0.13 | 0.025 | 0.006 | 0.0004 | high Cr |
| Material 8 | 0.030 | 2.110 | 0.10 | 0.018 | 0.002 | 0.15 | 23.50 | 0.09 | 0.06 | 0.025 | 0.006 | 0.0002 | high Si |

These slabs were subjected to hot forging, grinding, hot rolling, polishing (black-skin removal), cold rolling, intermediate annealing, and cold rolling under the manufacture conditions shown in Table 3, to produce rolled steel sheets with a thickness of 120 µm. Every one of these materials developed no edge cracks during cold rolling, showing good productivity.

TABLE 3

| | Forging | | | Hot rolling | | | | Cold rolling | | |
|---|---|---|---|---|---|---|---|---|---|---|
| Mark | Heating temp. | Time | Size | Heating temp. | Time | Reduction | Grinding | Cold rolling | Intermediate annealing | Cold rolling |
| Material 1 | 1250° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |
| Material 2 | 1250° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |
| Material 3 | 1250° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |
| Material 4 | 1250° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |
| Material 5 | 1250° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |
| Material 6 | 1250° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |
| Material 7 | 1250° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |
| Material 8 | 1200° C. | 3 h | Φ125-φ115 × 320 mm high → 20 mm thick | 1200° C. | 2 h | 20 → 4 t | 4 t → 3 t | 3 → 0.5 t | 800° C. × 10 min | 0.5 → 0.12 |

TABLE 4

| | Holding temp. (° C.) | Holding time (s) | Cooling | Note |
|---|---|---|---|---|
| HT1 | 1000 | 360 | rapid | low temp. |
| HT2 | 1100 | 280 | rapid | short time |
| HT3 | 1100 | 360 | rapid | — |
| HT4 | 1100 | 950 | rapid | long time |
| HT5 | 1250 | 360 | rapid | high temp. |

[Annealing Process]

A piece of material with a width of 70 mm and a length of 200 mm was cut out of each of the rolled steel sheets, and a continuous-annealing simulator was used to perform bright annealing and perform a nitrogen-absorption process in a solid phase (hereinafter referred to as "annealing process"). Table 4 shows heat patterns for the annealing process. A heat treatment was performed in which the pieces were held at the temperatures listed in the "Holding temp." column in Table 4 for the periods of time listed in the "Holding time" column before being rapidly cooled. The cooling rate, as represented by the average cooling rate until 500 OC, was in the range of 8 to 10° C./s.

Gases with the ratios of partial pressures shown in Table 5 were used for the annealing process. The total pressure was 1 atm.

TABLE 5

| Category | Partial pressure of nitrogen | Partial pressure of hydrogen |
|---|---|---|
| G1 | 0.25 | 0.75 |
| G2 | 0.50 | 0.50 |
| G3 | 0.90 | 0.10 |
| G4 | 0.00 | 1.00 |

[Pickling Process]

The materials after the annealing were pickled under the conditions shown in Table 6.

TABLE 6

| Category | Solution | Process temp. (° C.) | Process time (min) | Note |
|---|---|---|---|---|
| HF | Hydrofluoric acid (4% concentration) | 55 | 5 | non-oxidizing acid |
| $H_2SO_4$ | Sulfuric acid (25% concentration) | 60 | 10 | non-oxidizing acid |
| HCl | Hydrochloric acid (8% concentration) | 45 | 10 | non-oxidizing acid |
| $HNO_3$ | Nitric acid (4% concentration) | 45 | 5 | oxidizing acid |

The rolled steel sheets of Materials 1 to 8 (see Tables 2 and 3) were subjected to the annealing and pickling processes under the conditions listed in Table 7 to produce stainless steel sheets.

TABLE 7

| | | Annealing process | | | |
|---|---|---|---|---|---|
| No. | Material | Gas | Heat pattern | Pickling | Note |
| 1 | Material 1 | G2 | HT3 | HF | Low Cr |
| 2 | Material 2 | G2 | HT3 | HF | — |
| 3 | Material 3 | G2 | HT3 | HF | — |
| 4 | Material 4 | G2 | HT3 | HF | — |
| 5 | Material 5 | G2 | HT3 | HF | — |
| 6 | Material 6 | G2 | HT3 | HF | — |
| 7 | Material 7 | G2 | HT3 | HF | high Cr |
| 8 | Material 8 | G2 | HT3 | HF | high Si |
| 9 | Material 4 | G2 | HT1 | HF | annealing at low temp. |
| 10 | Material 4 | G2 | HT2 | HF | annealing for short time |
| 11 | Material 4 | G2 | HT5 | HF | annealing at high temp. |
| 12 | Material 4 | G1 | HT3 | HF | low nitrogen partial pressure |
| 13 | Material 3 | G3 | HT4 | $H_2SO_4$ | high nitrogen partial pressure |
| 14 | Material 5 | G2 | HT3 | $H_2SO_4$ | pickling with sulfuric acid |
| 15 | Material 3 | G2 | HT3 | HCl | pickling with hydrochloric acid |
| 16 | Material 3 | G2 | HT3 | $HNO_3$ | pickling with nitric acid |
| 17 | Material 4 | *see Tables 8 and 9 | | — | JP 2006-316338 A simulated |
| 18 | equiv. to Material 4 | — | — | — | U.S. Pat. No. 3,667,679 simulated |
| 19 | Material 5 | — | — | $H_2SO_4$ | no annealing |
| 20 | Material 5 | G2 | HT3 | — | no pickling |

No. 17 is a comparative example simulating the manufacture method of JP 2006-316338 A. JP 2006-316338 A describes a method of manufacturing a nitrogen-absorption stainless steel sheet in which a process of causing ferrite-based stainless steel to absorb nitrogen and subsequently performing cold rolling is repeated and, after completion of cold rolling, reduction is performed as an after-treatment in an atmosphere containing hydrogen gas.

Specifically, Material 4 in Table 3 was hot rolled and polished to a thickness of 3 mm and then cold rolled to reduce the wall thickness to 2 mm, and then a test stainless steel sheet was produced in accordance with the method shown in Table 1 of JP 2006-316338 A. The conditions for the test production are shown in Tables 8 and 9.

TABLE 8

| Reduction as pre-treatment | in 100% hydrogen-gas atmosphere, 1000° C. × 15 min |
|---|---|
| Cooling | Ar-gas flow, until room temp. |
| Rolling | 2.0→1.0, 1.0→0.55, 0.55→0.3, 0.3→0.19 |
| Rapid heating | 10° C./s |
| Nitrogen absorption | see Table 9; 100% nitrogen-gas atmosphere, 1050° C. |
| Cooling | 100° C./s |
| Rapid heating | 10° C./s |
| Reduction as after-treatment | in 100% hydrogen-gas atmosphere, 1000° C. × 10 min |
| Cooling | Ar-gas flow, until room temp., 100° C./s |

TABLE 9

| Number of times | Sheet thickness (mm) | Process time (min) |
|---|---|---|
| 1 | 2 | 60 |
| 2 | 1 | 60 |
| 3 | 0.55 | 45 |
| 4 | 0.3 | 30 |
| 5 | 0.19 | 20 |

No. 18 is a comparative example simulating the manufacture method of Japanese Patent No. 3667679. A material of the composition of Fe-23.5 Cr-0.8 N was melted by ESR under nitrogen pressure. The resulting slab was machined to cut out a piece of material with a thickness of 3 mm, which was subjected to cold rolling. During cold rolling, cracks occurred on edges, which made it impossible to achieve a thickness smaller than 0.5 mm by rolling. In view of this, a steel sheet with a thickness of 0.5 mm was evaluated in the same manner in which the other examples were evaluated.

No. 19 is a comparative example that was not subjected to the annealing process. The conditions other than those for the annealing process were the same as for No. 5.

No. 20 is a comparative example that was not subjected to the pickling step. The conditions other than those for the pickling process were the same as for No. 5.

[Investigation of Structure and Other Characteristics]

A specimen was taken out of a central portion, as determined along the sheet-thickness direction, of each stainless steel sheet, and N content was measured.

On a cross-sectional photomicrograph of each stainless steel sheet, γ-grain size was measured by the method described in the context of the embodiments.

On the surface of each stainless steel sheet, the distribution of Cr, Fe and N contents in the sputter-depth range of 0 to 0.5 μm was measured by GD-OES. The measurement used a Marcus-type high-frequency glow discharge emission spectroscopic analyzer from Horiba, Ltd. (GD-Profiler 2).

The surface of each stainless steel sheet was observed by SEM and the surface geometry was investigated.

The microstructure in the surface layer of each stainless steel sheet was identified by thin-film X-ray diffraction at an incident angle of 0.3°, the source being a Co Kα-line. The penetration depth was about 0.5 μm.

The microstructure in the outermost layer of each stainless steel sheet was identified in a TEM electron diffraction image. Further, it was determined in a TEM dark-field image whether the outermost surface was covered with CrN.

The investigation results are shown in Table 10.

[Measurement of Contact Resistance]

The value of the resistance of a stainless steel sheet directly after production and the value of the resistance after a duration test simulating a battery environment were measured. Specifically, the duration testing was conducted by immersing a stainless steel sheet in $H_2SO_4$ at 90° C. and with a pH of 2 for 96 hours, before the sheet was thoroughly

TABLE 10

| No. | N content (mass %) | γ grain size (μm) | GD-OES Cr/Fe | Cr/N | Surface geometry | Thin-film X-ray diffraction γ | α' | $Cr_2N$ | CrN | TEM $Cr_2N$ | CrN | Coating |
|---|---|---|---|---|---|---|---|---|---|---|---|---|
| 1 | 0.40 | 47 | 0.25-0.4 | <1.6 | surface with recesses | P | M | — | — | M | P | present |
| 2 | 0.72 | 35 | 0.25-0.4 | <1.6 | terraced structure | M | — | — | — | M | P | present |
| 3 | 0.78 | 42 | 0.2-0.35 | <1.7 | terraced structure | M | — | — | — | M | P | present |
| 4 | 0.82 | 51 | 0.15-0.4 | <1.7 | terraced structure | M | — | — | — | M | P | present |
| 5 | 0.92 | 36 | 0.2-0.36 | <1.7 | terraced structure | M | — | — | — | M | P | present |
| 6 | 1.20 | 38 | 0.2-0.37 | <1.6 | terraced structure | M | — | — | — | M | P | present |
| 7 | 1.10 | 39 | 0.2-0.39 | <1.7 | terraced structure | M | — | — | — | M | P | present |
| 8 | 0.63 | 44 | 0.33-0.4 | <1.9 | terraced structure | M | P | — | — | M | P | present |
| 9 | 0.66 | 41 | 0.21-0.4 | <1.7 | terraced structure | M | — | — | — | M | P | present |
| 10 | 1.10 | 39 | 0.26-0.34 | <1.4 | terraced structure | M | — | — | — | M | P | present |
| 11 | 1.60 | 56 | 0.39-0.48 | <1.75 | terraced structure | M | — | — | — | M | P | present |
| 12 | 0.61 | 48 | 0.18-0.32 | <1.5 | terraced structure | M | — | — | — | M | P | present |
| 13 | 0.93 | 37 | 0.2-0.44 | <1.7 | terraced structure | M | — | — | — | M | P | present |
| 14 | 1.02 | 41 | 0.22-0.36 | <1.7 | terraced structure | M | — | — | — | M | P | present |
| 15 | 0.99 | 42 | 0.21-0.32 | <1.7 | terraced structure | M | — | — | — | M | P | present |
| 16 | 0.87 | 43 | 0.31-1.02 | <1.9 | rolled surface | M | P | P | P | M | P | absent |
| 17 | 0.94 | 32 | 0.2-2.7 | <1.9 | rolled surface | P | P | M | P | M | — | — |
| 18 | 0.80 | 252 | 0.32-0.37 | <6.8 | rolled surface | M | — | — | — | — | — | — |
| 19 | 0.008 | 19 | 0.34-0.36 | <835 | surface with recesses | — | M | — | — | — | — | — |
| 20 | 0.92 | 36 | 0.2-2.2 | <2.0 | rolled surface | P | P | P | P | M | P | absent |

The "γ grain size" column in Table 10 lists the values of the average grain size of austenite crystal grains for the various stainless steels. For No. 19, in which no austenite phase was produced, the average grain size of α' grains is indicated.

The "GD-OES" columns of Table 10 show the Cr/Fe and Cr/N ranges at sputter depths of 0 to 0.5 μm.

The "Thin-film X-ray diffraction" columns in Table 10 illustrate the microstructure of the surface layer identified by thin-film X-ray diffraction. "M" in the "γ", "α'", "$Cr_2N$" and "CrN" columns means that the relevant phase was the main phase (i.e., had the largest proportion). "P" in these columns means that the relevant phase was present (i.e., a diffraction line of the relevant phase was observed). "-" in these columns means that no diffraction line of the relevant phase was observed.

The "TEM" columns of Table 10 illustrate the microstructure of the outermost surface identified by TEM. "M" in the "$Cr_2N$" and "CrN" columns means that the relevant phase was the main phase (i.e., had the largest proportion). "P" in these columns means that the relevant phase was present (i.e., a diffraction line of the relevant phase was observed"). "-" in these columns means that no diffraction line of the relative phase was observed. In addition, the "Coating" column indicates whether the sheet was coated with CrN.

[Measurement of Elongation]

An ASTM half-size test specimen with an original thickness and a length of 100 mm was cut out of each stainless steel sheet. Tensile testing was performed in accordance with ASTM A370 at a strain rate of $1 \times 10^{-3}$/s to measure yield strength, tensile strength, and elongation (i.e., elongation at the time of the break). An elongation of 15% or higher was determined to have good press workability.

water washed and dried. If the corrosion resistance of a stainless steel sheet is not good, a passivity film forms on the surface, thus increasing contact resistance. The sheet was determined to have low contact resistance if the contact resistance was not higher than 10 mΩ·cm² before and after the duration test.

Figure 9:
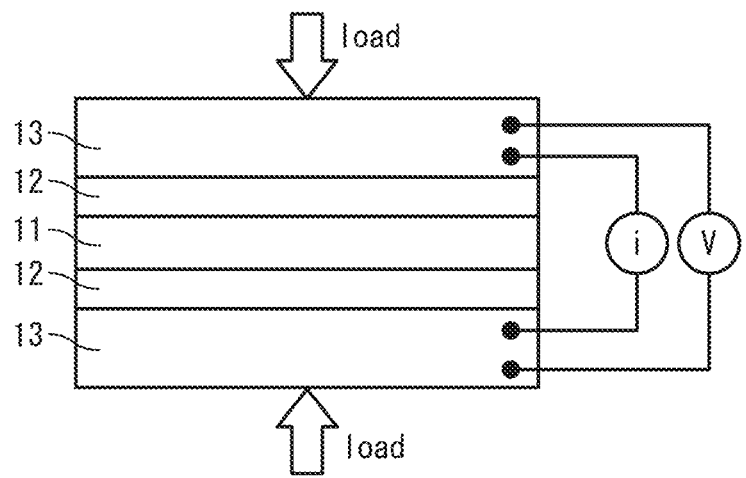
FIG. 9 is a schematic view of an apparatus used to measure contact resistance.

Contact resistance was measured in accordance with the method reported in: Jun Suzuki et al., "Reduction in contact resistance due to post-pickling heat treatment of noble-metal-containing titanium alloys", "Titanium" magazine from the Japan Titanium Society, Vol. 54 (2006), No. 4, p. 259. Specifically, the measurement was performed using an apparatus as schematically shown in FIG. 9. A stainless steel sheet 11 was sandwiched by layers of carbon paper that is used as a gas diffusion layer (TPG-H-90 from Toray Industries, Inc.), denoted by 12, with an area of 1 cm², and this assembly was further sandwiched by gold-plated electrodes 13. A constant current was caused to flow between the electrodes while a load of 10 kgf/cm² was applied to both ends of the electrode system 13, and the voltage drop between the carbon paper 12 and stainless steel sheet 11 was measured. Contact resistance was determined from the result of this measurement. The obtained value of contact resistance was the sum of the contact resistances at the two sandwiched surfaces (i.e., penetration resistance); in view of this, this value was divided by 2 to determine the contact resistance for one surface of the gas diffusion layer. Current and voltage drop were measured using a digital multi-meter (Keithley 2001 from Toyo Corporation).

[Measurement of Pitting Potential]

Pitting potential was measured in accordance with JIS G0577. The test bath was a 3.5% NaCl aqueous solution. The test bath was degassed, and a stainless steel sheet was completely immersed therein and left for 10 minutes before anodic polarization was performed using the potentiodynamic method beginning at the spontaneous potential at a potential sweep rate of 20 mV/min. The potential corresponding to the current density of 100 µAcm$^{-2}$ was treated as pitting potential. A sheet with a pitting potential higher than 0.75 V vs SCE was determined to have good pitting resistance for evaluation.

[Evaluation of Transpassive Corrosion Resistance]

The transpassive corrosion resistance of a stainless steel sheet was evaluated by immersing the sheet in an H$_2$SO$_4$ solution at 80° C. and with a pH of 3 simulating a battery environment, and Ar gas was blown in for degassing before the sheet was held at the spontaneous potential for 10 minutes; then, anodic polarization was performed beginning at the spontaneous potential and ending at 1.4 V vs SHE at a sweep rate of 20 mV/min. In a stainless steel sheet, an increase in current density due to transpassive corrosion is observed beginning at about 0.9 V vs SHE. The maximum current density for a range of 0.9 V and higher, which can be considered to be a transpassive range, was treated as an indicator of transpassive corrosion resistance. A sheet of which the maximum current density for 0.9 V or higher was lower than 100 µA/cm$^2$ was determined to have good transpassive corrosion resistance for evaluation.

The results are shown in Table 11.

TABLE 11

| No. | Elongation (%) | Contact resistance (mΩ · cm$^2$) Pre-duration | Contact resistance (mΩ · cm$^2$) Post-duration | Pitting potential (V vs SCE) | Maximum current for transpassivity (µA/cm$^2$) |
|---|---|---|---|---|---|
| 1 | 6.3 | 6.3 | 16.7 | 0.13 | 189 |
| 2 | 21.3 | 4.8 | 4.9 | — | 48.4 |
| 3 | 22.4 | 4.2 | 4.8 | — | 72.6 |
| 4 | 29.4 | 3.7 | 4.3 | — | 51.9 |
| 5 | 27.2 | 3.8 | 3.9 | — | 64.7 |
| 6 | 20.2 | 4.2 | 4.4 | — | 76.2 |
| 7 | 14.4 | 3.9 | 4.3 | — | 94.1 |
| 8 | 12.2 | 8.2 | 13.2 | 0.33 | 119.3 |
| 9 | 15.1 | 9.1 | 9.8 | 0.77 | 87.9 |
| 10 | 16.7 | 8.7 | 8.9 | 0.76 | 76.4 |
| 11 | 15.3 | 8.8 | 9.3 | 0.83 | 73.3 |
| 12 | 15.4 | 6.1 | 8.9 | — | 68.3 |
| 13 | 16.7 | 4.6 | 5.6 | 0.78 | 86.7 |
| 14 | 25.3 | 4.1 | 4.4 | — | 66.4 |
| 15 | 23.0 | 4.9 | 4.8 | — | 58.6 |
| 16 | 23.1 | 539 | 497 | 0.39 | 389 |
| 17 | 14.2 | 10.4 | 421 | 0.22 | 643 |
| 18 | 14.1 | 24 | 32 | 0.83 | 318 |
| 19 | 14.9 | 322 | 387 | 0.41 | 429 |
| 20 | 15.1 | 462 | 477 | 0.76 | 964 |

As shown in Tables 10 and 11, each of the stainless steel sheets labeled Nos. 2 to 6 and 9 to 15 had a microstructure made of an austenite single phase and had a γ-grain size of one half of the sheet thickness (120 µm) or smaller. During measurement of γ-grain size, it was made sure that the sheet, including its central portions as determined along the sheet-thickness direction, was made of an austenite single phase. These stainless steel sheets had an elongation of 15% or larger and exhibited good press workability.

Further, in the stainless steel sheets labeled Nos. 2 to 6 and 9 to 15, Cr/Fe in the portions near the surface was in the range of 0.1 to 0.5 and Cr/N in the portions near the surface was not more than 1.8. These stainless steel sheets had a terrace-shaped surface. It was determined from TEM observation that the Cr nitrides contained Cr$_2$N and CrN and the outermost surface was coated with CrN.

The stainless steel sheets labeled Nos. 2 to 6 and 9 to 15 exhibited good evaluation results in terms of any of contact resistance, pitting resistance, and transpassive corrosion resistance. Particularly, the stainless steel sheets labeled Nos. 2 to 6, 14 and 15, which had annealing conditions within the suitable ranges, developed no pitting.

For the stainless steel sheet labeled No. 1, the Cr content of Material 1 was insufficient and the amount of absorbed nitrogen was small, failing to result in an austenite single phase. The surface did not have a terrace-shaped structure, and corrosion recesses were observed that had been produced during pickling. The stainless steel sheet labeled No. 1 had a low elongation and thus was not suitable for applications requiring working, and had poor corrosion resistance.

The stainless steel sheet labeled No. 7 had a low elongation because the Cr content of Material 7 was too high.

For the stainless steel sheet labeled No. 8, the Si content of Material 8 was excessively high such that an α' phase was present in the microstructure, with low elongation and poor corrosion resistance.

The stainless steel sheet labeled No. 16 was pickled with a solution containing an oxidizing acid, and thus the surface did not have a terrace-shaped structure. It had high contact resistance and poor corrosion resistance.

The stainless steel sheet labeled No. 17 had a low elongation. Further, the contact resistance deteriorated after the duration test.

The stainless steel sheet labeled No. 18 had large crystal grains and a low elongation. Further, it had a high contact resistance since no electrically conductive compound was present on the surface.

The stainless steel sheet labeled No. 19 was not subjected to the annealing process and thus the microstructure was not changed to an austenite phase. As such, it had a poor corrosion resistance.

The stainless steel sheet labeled No. 20 was not pickled and thus the surface did not have a terrace-shaped structure. It had a high contact resistance since passivity film Cr$_2$O$_3$ remained on the surface.

Figure 10:
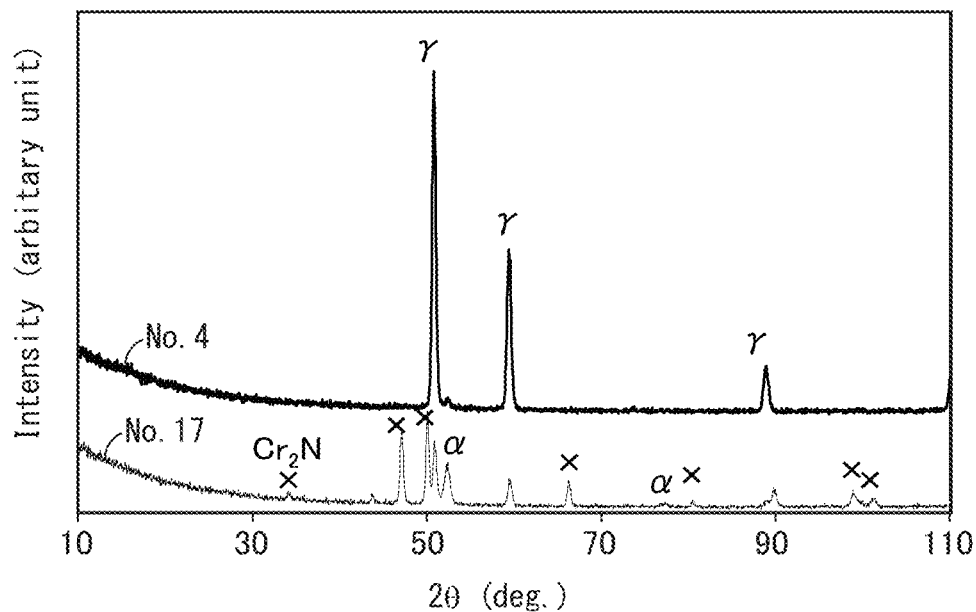
FIG. 10 shows thin-film X-ray diffraction patterns of the stainless steel sheets labeled Nos. 4 and 17.

FIG. 10 shows thin-film X-ray diffraction patterns of the stainless steel sheets labeled Nos. 4 and 17. Only austenite peaks can be recognized in the diffraction pattern of No. 4, while the diffraction pattern of No. 17 shows that α'-phase and Cr$_2$N peaks are present in an mixed manner.

Figure 11A:
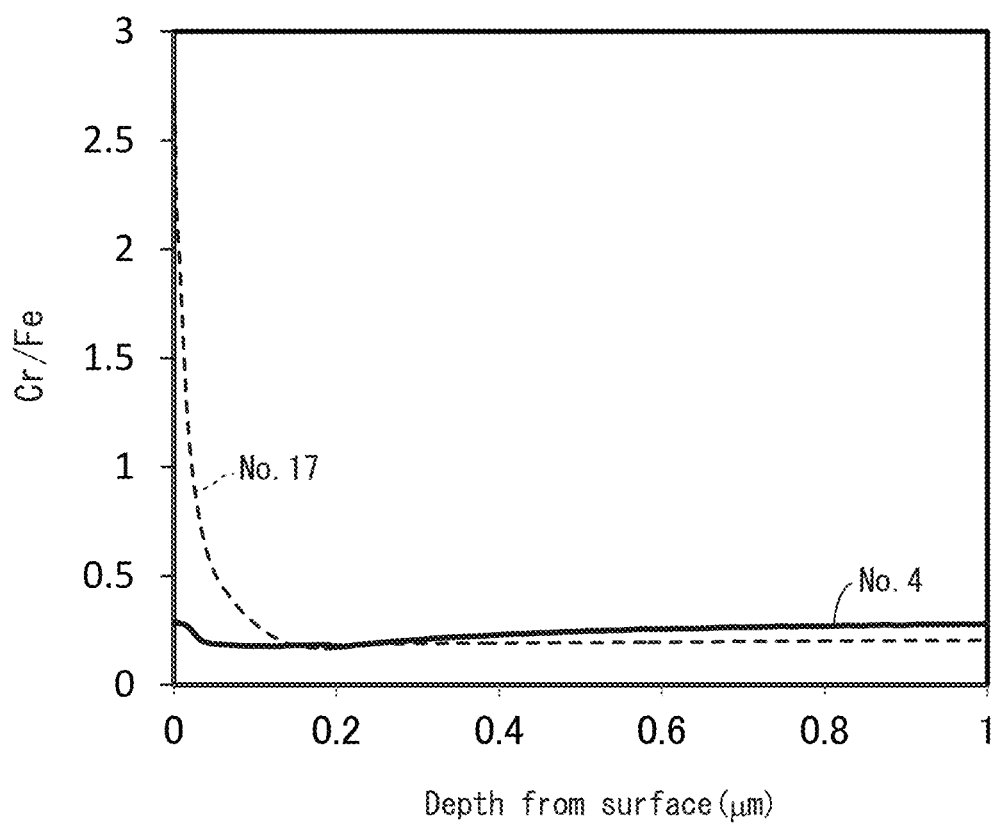
FIG. 11A shows Cr/Fe profiles of the surface and nearby portions of the stainless steel sheets labeled Nos. 4 and 17, as measured by GD-OES.
Figure 11B:
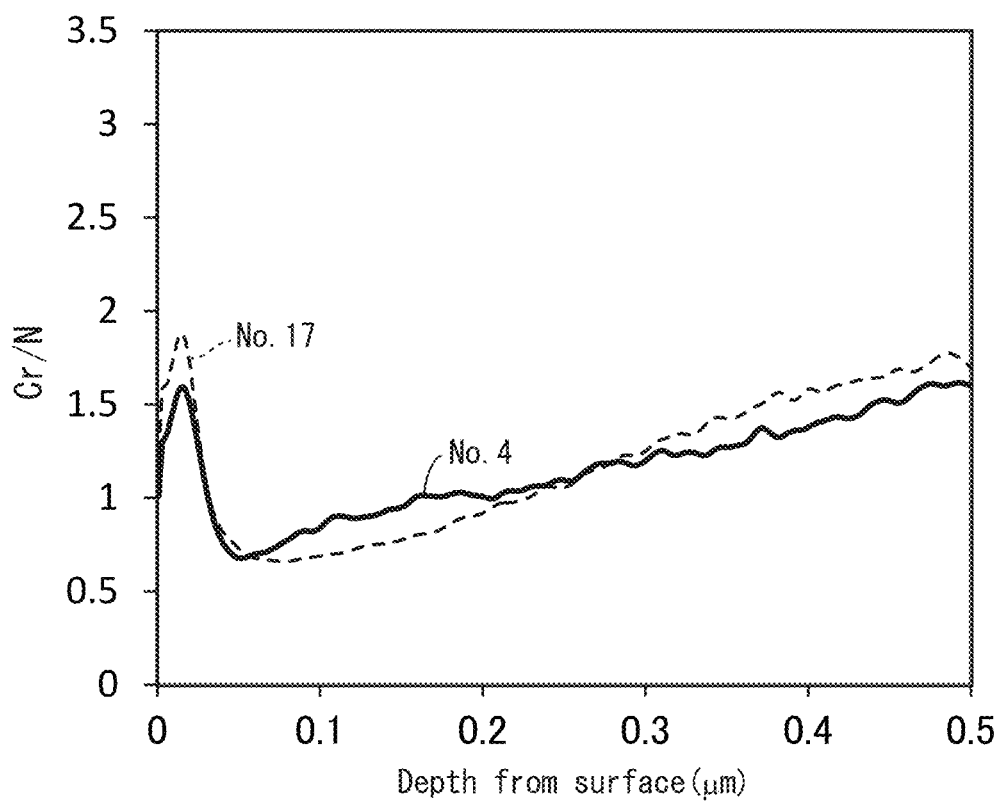
FIG. 11B shows Cr/N profiles of the surface and nearby portions of the stainless steel sheets labeled Nos. 4 and 17, as measured by GD-OES.

FIG. 11A shows the profile of Cr/Fe in the portions near the surface of each of the stainless steel sheets labeled Nos. 4 and 17, obtained by GD-OES. FIG. 11B shows the profile of Cr/N in the portions near the surface of each of the stainless steel sheets labeled Nos. 4 and 17, obtained by GD-OES. In the stainless steel sheet labeled No. 17, the value of Cr/Fe rapidly increases at the outermost surface. This is presumably because large amounts of Cr$_2$N are present on the surface of the stainless steel sheet labeled No. 17.

Figure 12:
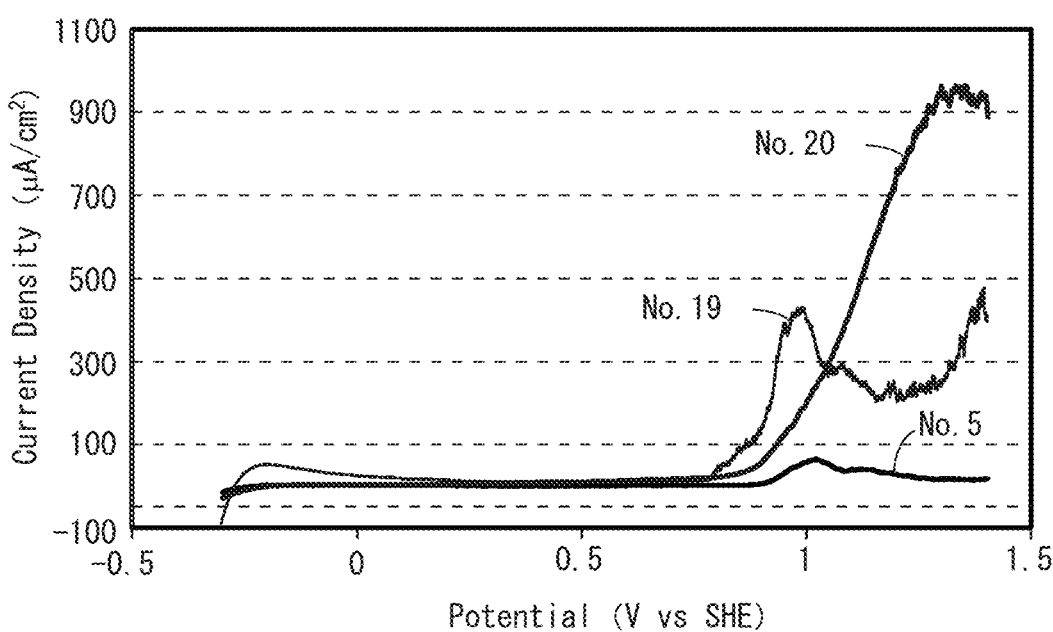
FIG. 12 is a graph showing the relationship between the potential and current density for the stainless steel sheets labeled Nos. 5, 19 and 20.

FIG. 12 shows a graph showing the relationship between the potential and current density of each of the stainless steel sheets labeled Nos. 5, 19 and 20. In the stainless steel sheet labeled No. 5, the current density hardly increases even when the potential exceeds 0.9 V vs SHE. This shows that the stainless steel sheet labeled No. 5 has good transpassive corrosion resistance.

Embodiments of the present invention have been described. The above-illustrated embodiments are merely examples for carrying out the present invention. Therefore, the present invention is not limited to the above-illustrated embodiments, and the above-illustrated embodiments can be modified appropriately without departing from the spirit of the invention.

The invention claimed is:

1. A stainless steel sheet having a chemical composition of, in mass %:
20 to 26% Cr;
0.6 to 2.0% N;
up to 2.0% Si;
up to 0.040% C;
up to 0.030% P;
up to 0.030% S;
up to 1.5% Mn;
up to 0.50% Cu;
up to 0.50% Mo;
up to 0.10% Ni;
lower than 50 ppm Ca;
lower than 300 ppm sol. Al; and
balance Fe and impurities,
the stainless steel sheet having a thickness of 50 to 200 µm,
a microstructure of teh stainless steel sheet being an austenite single phase,
an average crystal grain size of austenite crystal grains being one half or less of a thickness of the stainless steel sheet,
a surface of the stainless steel sheet having a Cr nitride layer,
wherein Cr, Fe and N contents obtained by glow discharge optical emission spectroscopy of the surface of the stainless steel sheet, as determined by an analysis along a depth direction of a sputter-depth range of 0 to 0.5 µm, satisfy the following expressions, (1) and (2):

$$0.1 \leq Cr/Fe \leq 0.5 \quad (1), \text{ and}$$

$$Cr/N \leq 1.8 \quad (2),$$

wherein Cr, Fe and N in expressions (1) and (2) represent Cr, Fe and N contents, in atomic percentage, obtained by glow discharge optical emission spectroscopy of the surface of the stainless steel sheet.

2. A separator for a solid polymer fuel cell comprising the stainless steel sheet according to claim 1.

3. A solid polymer fuel cell comprising the separator for a solid polymer fuel cell according to claim 2.

4. A solid polymer fuel cell battery comprising a plurality of solid polymer fuel cells, each according to claim 3.

5. A method of manufacturing the stainless steel sheet of claim 1, comprising:
preparing a slab having a chemical composition of, in mass %: 20 to 26% Cr; up to 0.1% N; up to 2.0% Si; up to 0.040% C; up to 0.030% P; up to 0.030% S; up to 1.5% Mn; up to 0.50% Cu; up to 0.50% Mo; up to 0.10% Ni; lower than 50 ppm Ca; lower than 300 ppm sol. Al; and balance Fe and impurities;
performing hot rolling and cold rolling on the slab to produce a rolled steel sheet with a thickness of 50 to 200 µm;
an annealing step in which the rolled steel sheet is annealed and cooled in a gas atmosphere containing nitrogen, wherein a ratio of partial pressure of nitrogen to total pressure of process gas is 0.4 to 0.7, annealing occures at a temperature of 950 to 1200°C. with a holding time of 300 to 900 seconds; and
pickling the rolled steel sheet after the annealing step with a solution containing a non-oxidizing acid,
the stainless steel sheet having an N content of 0.6 to 2.0% by mass.

* * * * *